United States Patent [19]

Thompson et al.

[11] Patent Number: 4,716,588
[45] Date of Patent: Dec. 29, 1987

[54] ADDRESSABLE SUBSCRIPTION TELEVISION SYSTEM HAVING MULTIPLE SCRAMBLING MODES

[75] Inventors: John R. Thompson, La Quinta; Curtis J. Hunting, Altadena; Ronald K. Masson, Topanga; Craig E. Trivelpiece, Irvine, all of Calif.

[73] Assignee: Payview Limited, Hong Kong

[21] Appl. No.: 792,704

[22] Filed: Oct. 29, 1985

[51] Int. Cl.⁴ ............................................. H04N 7/167
[52] U.S. Cl. ........................................ 380/20; 380/11; 380/15; 380/17
[58] Field of Search ............... 358/117, 120, 122, 124; 380/15, 17, 20, 11; 178/37

[56] References Cited

U.S. PATENT DOCUMENTS

| | | | |
|---|---|---|---|
| 3,460,161 | 8/1969 | Waller et al. | 358/120 |
| 3,485,941 | 12/1969 | Bass | 358/120 |
| 3,801,732 | 4/1974 | Reeves | 358/124 |
| 4,045,814 | 8/1977 | Hartung et al. | 358/124 |
| 4,075,660 | 2/1978 | Horowitz | 358/123 |
| 4,278,837 | 7/1981 | Best | 178/22.09 |
| 4,325,078 | 4/1982 | Seaton et al. | 358/117 |
| 4,389,671 | 6/1983 | Posner et al. | 380/10 |
| 4,471,380 | 9/1984 | Mobley | 358/120 |
| 4,527,195 | 7/1985 | Cheung | 358/120 |
| 4,575,755 | 3/1986 | Schoeneberger et al. | 358/120 |
| 4,613,902 | 9/1986 | Ohmori | 358/121 |

Primary Examiner—Stephen C. Buczinski
Attorney, Agent, or Firm—Pollock, Vande Sande & Priddy

[57] ABSTRACT

A multimode scrambling system for video signal transmission systems is described. The system provides for baseband video scrambling controlled by a central originating computer facility. The scrambling of each field of a video changes on a per field basis. The video signal is scrambled in several modes including vertical interval scrambling, alternate line inversion, bogus sync pulse generation, video compression and video offset techniques. A scrambling sequence is sent by a unique algorithm, sent during the vertical interval to each system decoder. The algorithm is reordered for each of a plurality of fields of the video signal and the reordering position is identified by a unique synchronization pulse transmitted during the vertical interval of the video signal. Additional security measures are provided to inhibit a subscriber from avoiding a transmitted disable command, or an attempt to invade the subscriber decoder mechanical packaging security.

22 Claims, 21 Drawing Figures

VERTICAL BLANKING INTERVAL

ACTIVE VIDEO SCRAMBLING

ENCODER MICROPROCESSOR

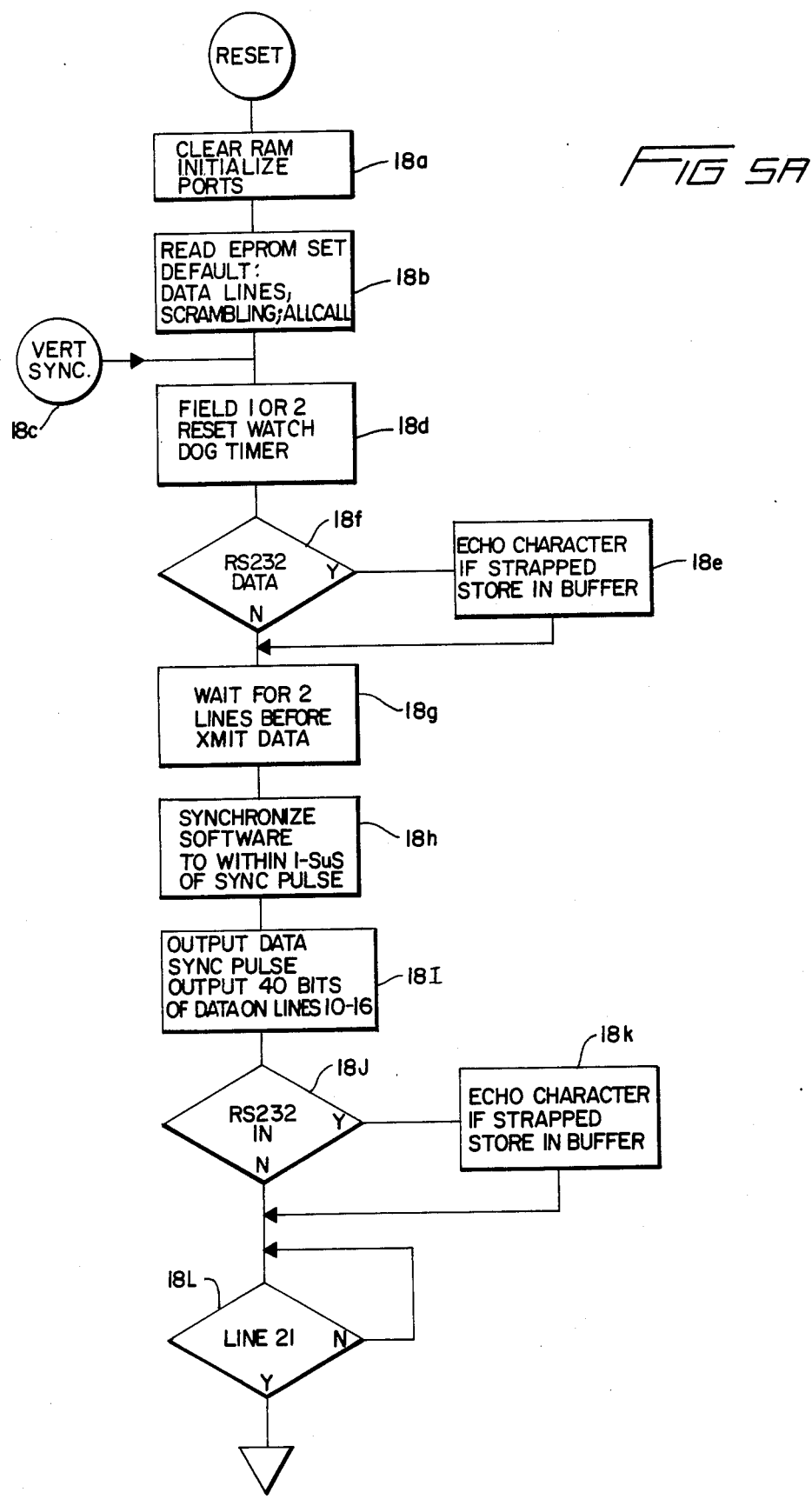

ENCODER TIMING GENERATOR

BOGUS SYNC PULSE COUNTER

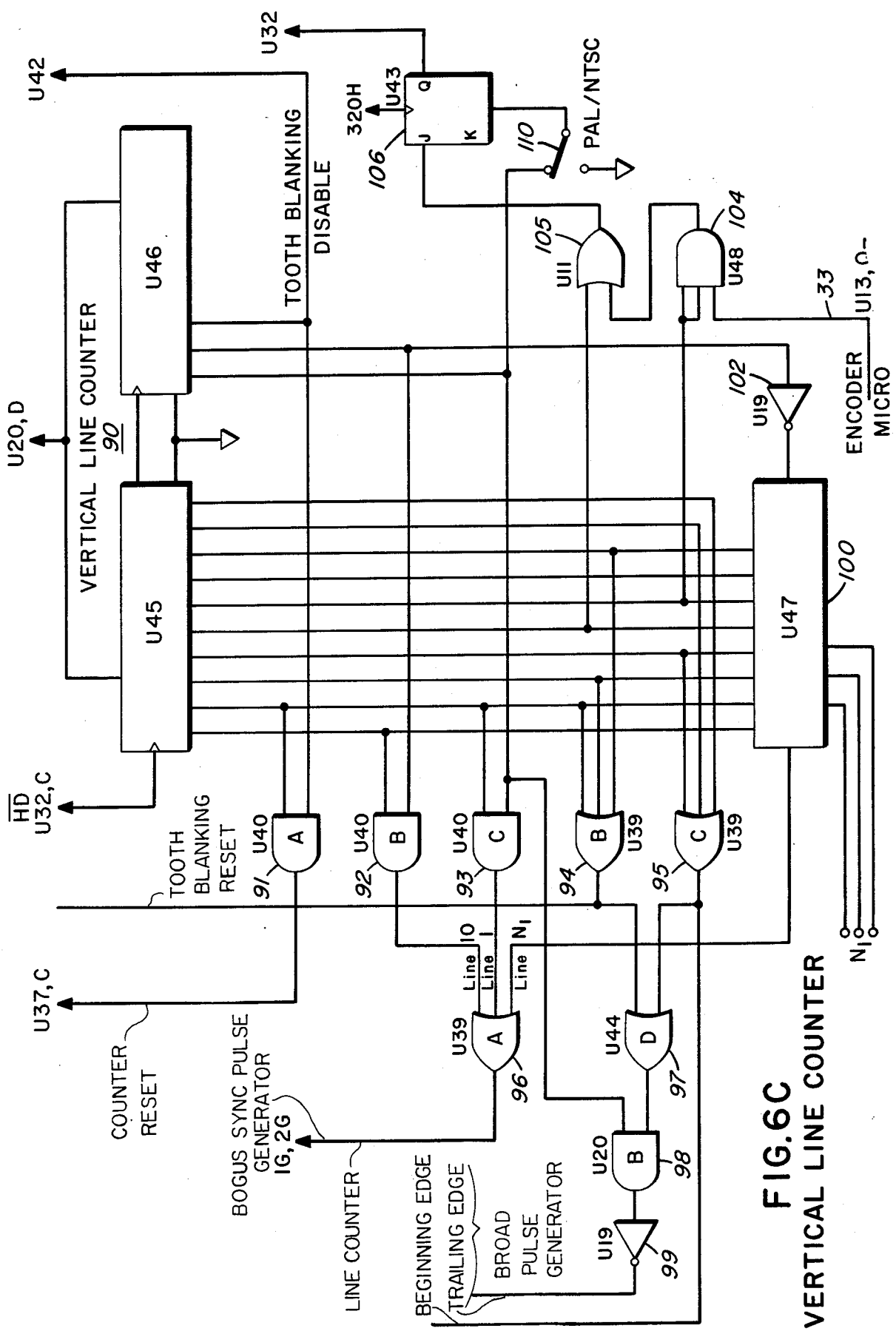
FIG.6C VERTICAL LINE COUNTER

ENCODER TIMING GENERATOR

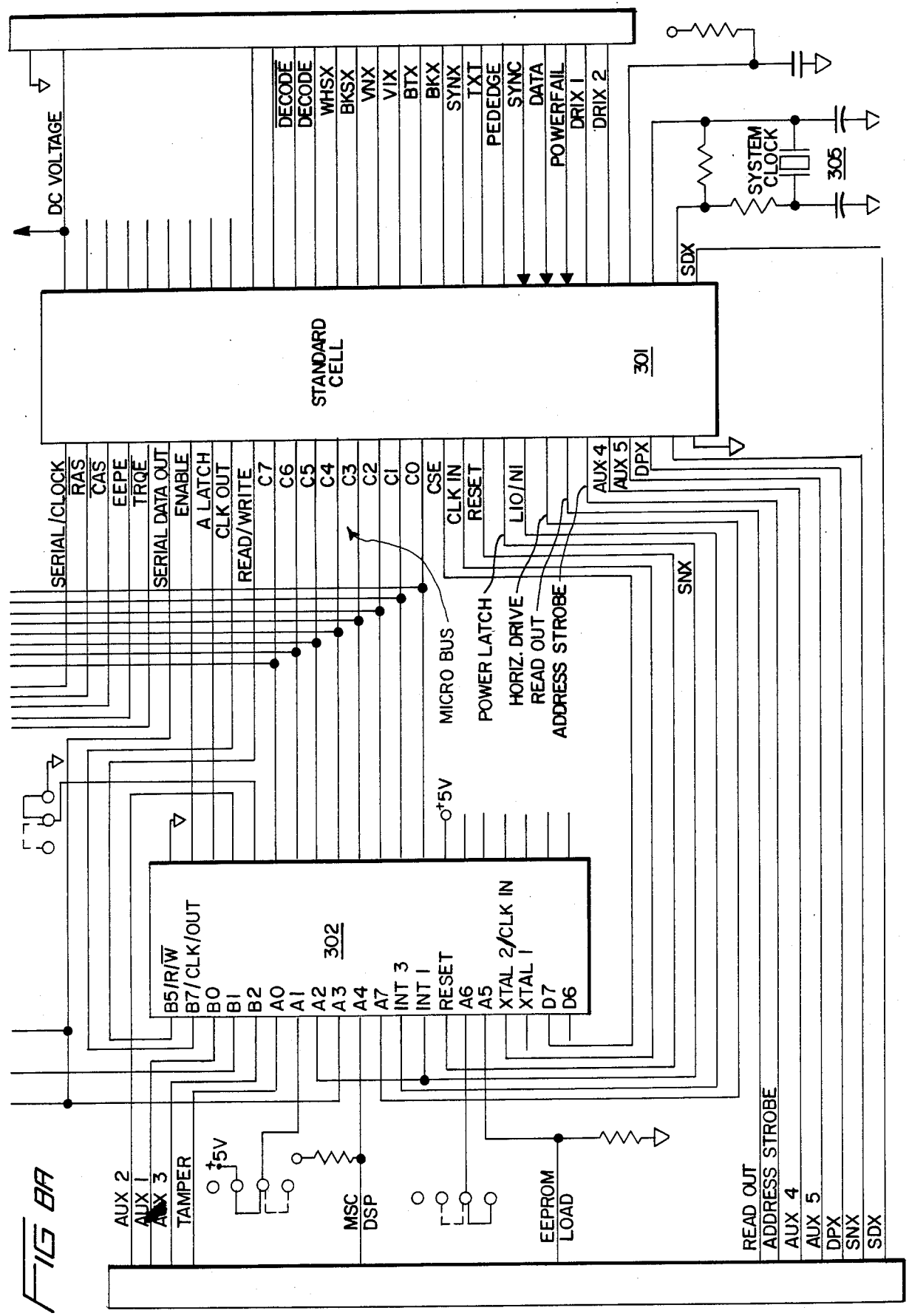

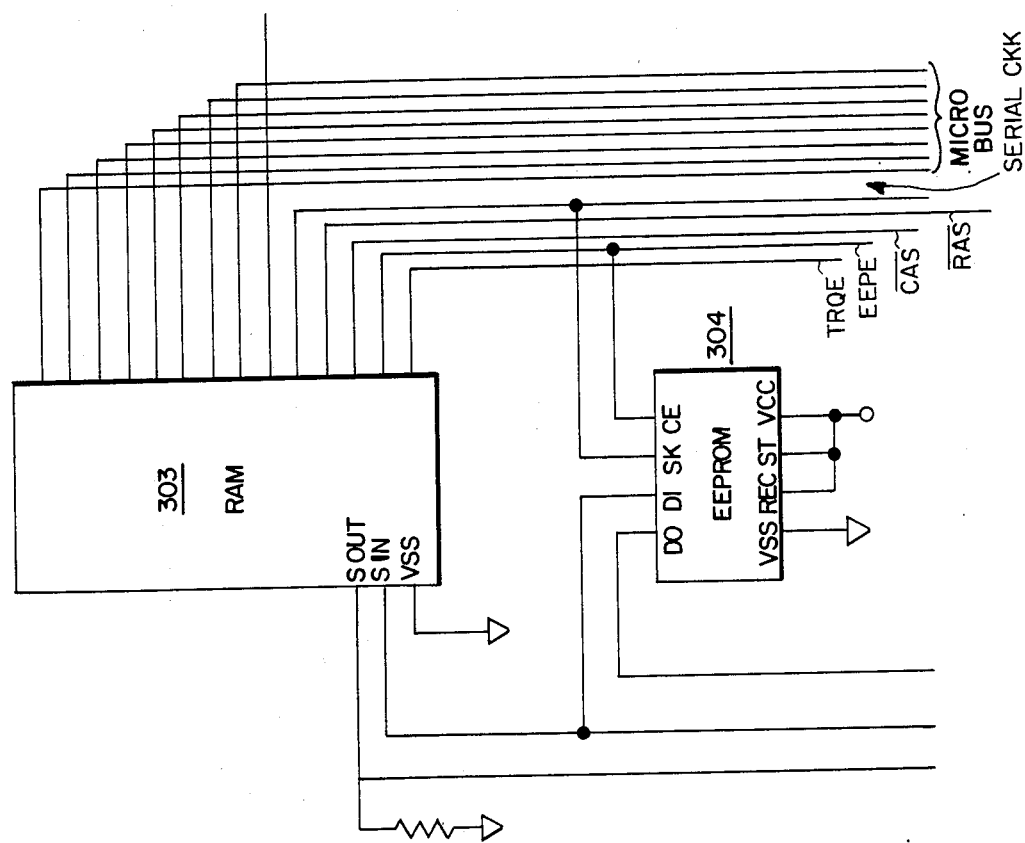

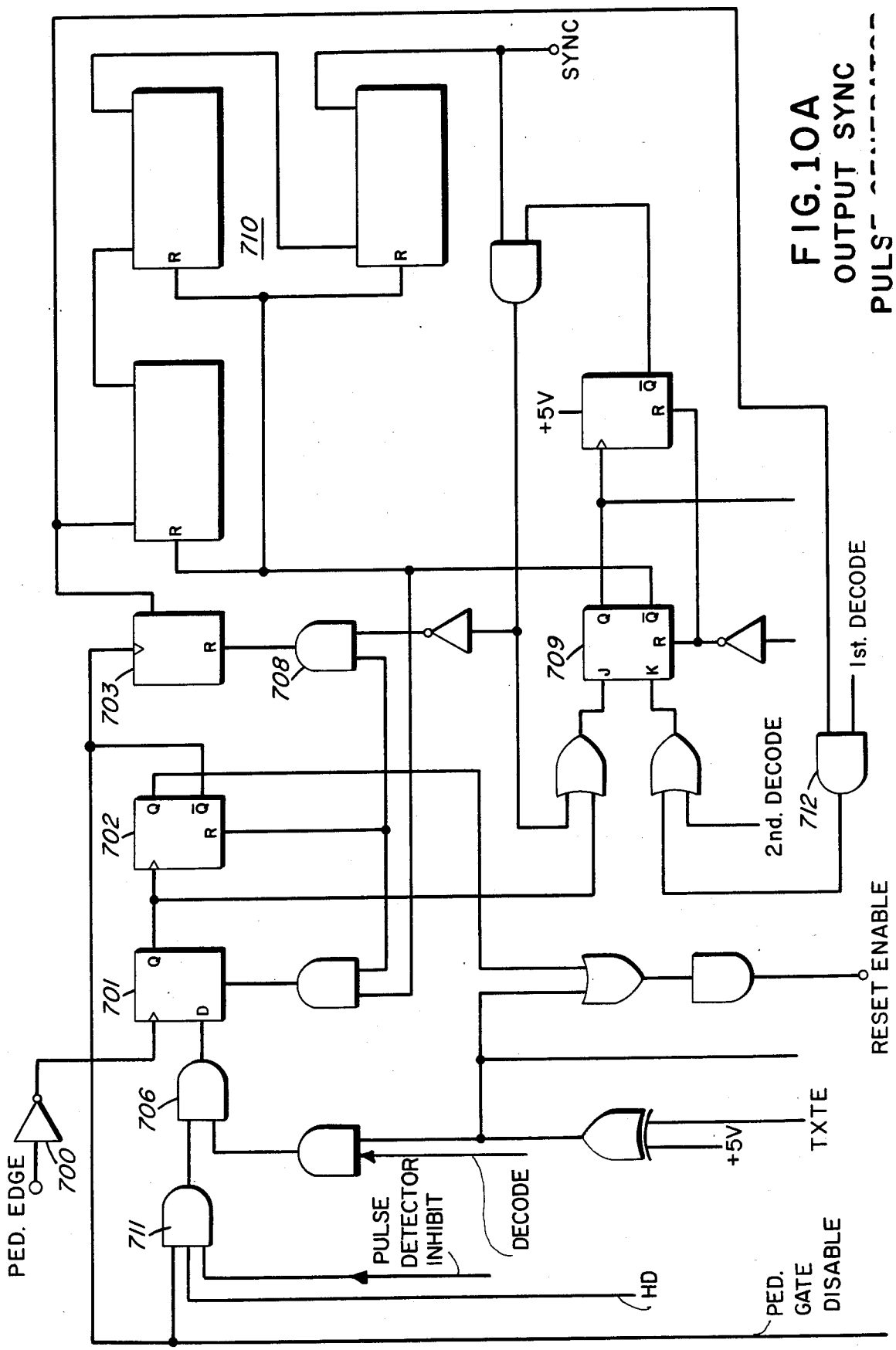

RESET PULSE GENERATOR

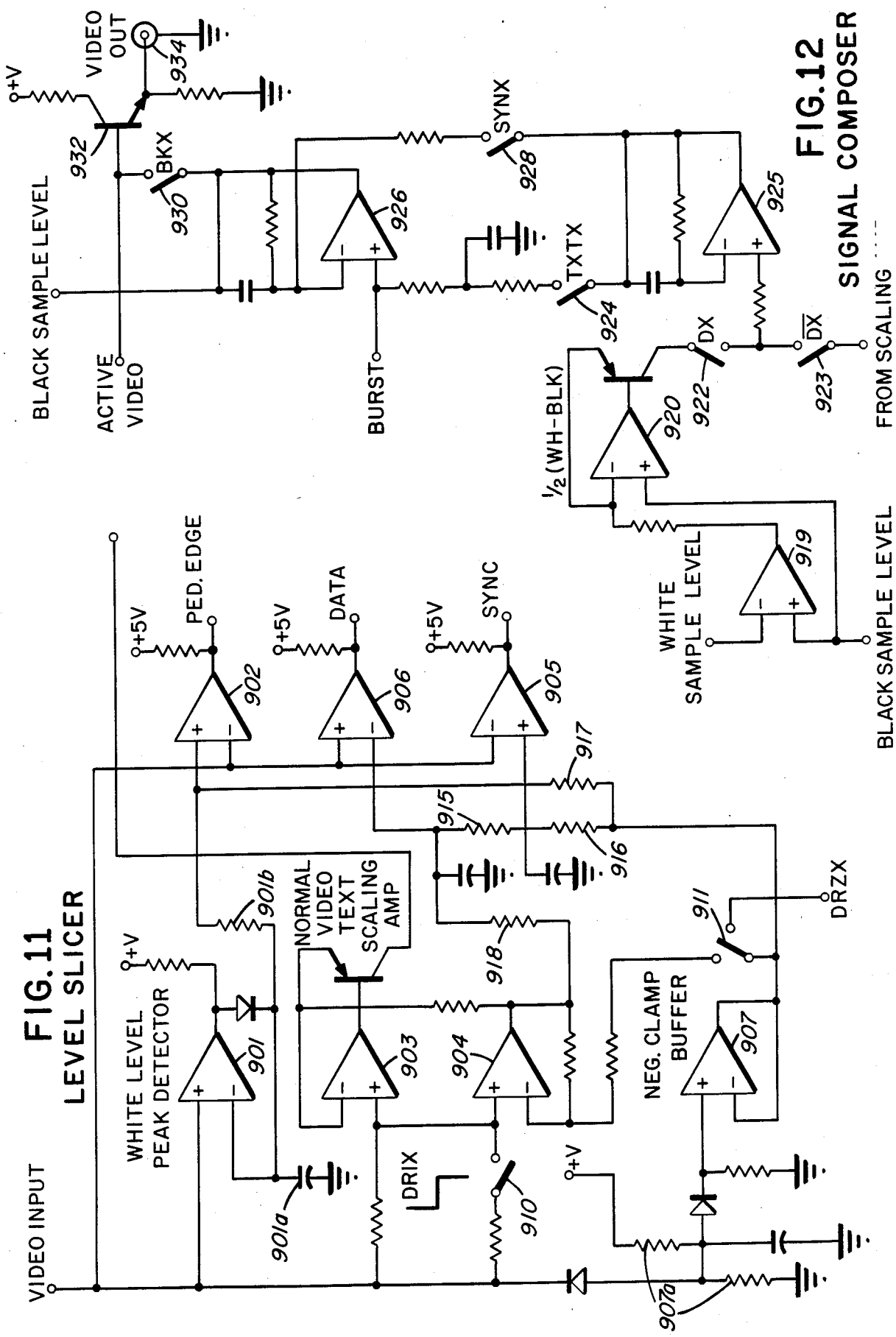

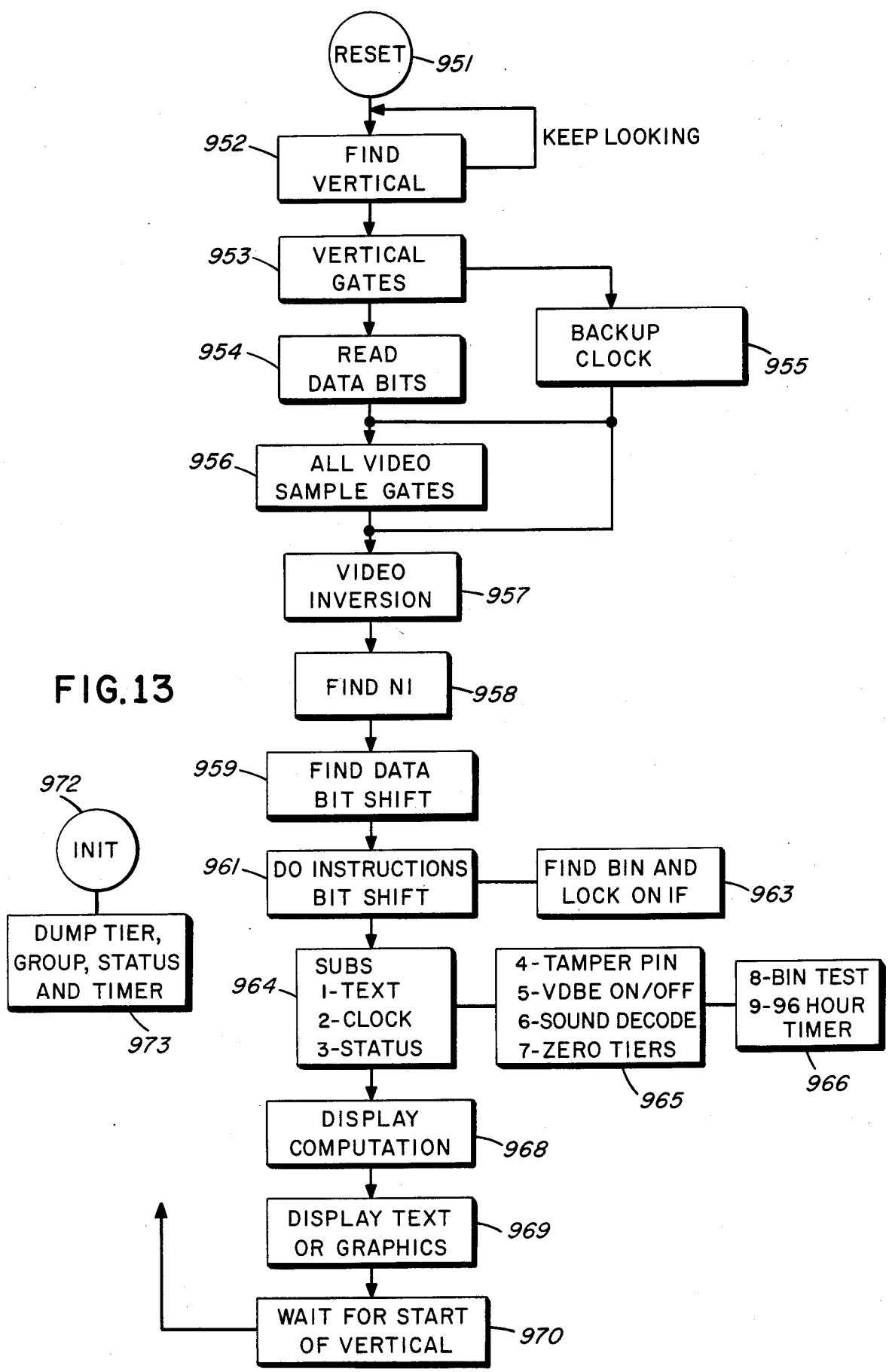

ADDRESSABLE SUBSCRIPTION TELEVISION SYSTEM HAVING MULTIPLE SCRAMBLING MODES

BACKGROUND OF THE INVENTION

The present invention relates to a system for securing television broadcasts against unauthorized viewing. Specifically, a system for encoding a standard video signal in a plurality of scrambling modes is described.

Cable television, as well as direct satellite broadcasts, hotels, and other institutions, have developed signal distribution systems for delivering pay television broadcasts to various subscribers. These broadcasts can be carried out on several channels and different categories of programs can be supplied at a subscription rate different for each of these categories, or tiers of broadcast service.

Systems for scrambling the broadcast to prevent unauthorized viewing have been instituted by most of the program originators. Requirements to maintain a scrambling system cost to a minimum has necessarily limited the extent to which the signal can be scrambled. Consequently, unauthorized descrambling of the video signal is carried out with only a minimum of effort on the part of signal pirates.

An additional cost imposed upon scrambling broadcasts in a cable system include the necessity of most of these systems to send a serviceman to a subscriber's location to enable or disable reception of a pay television broadcast. It is therefore advantageous to provide a scrambling system which would permit enablement and disablement of subscriber decoders at the head end without the additional cost of a service person going to the subscriber's location.

One of the more popular techniques used for scrambling a television signal depends on altering the synchronization pulse of the base band video. These systems either suppress a group of synchronization pulses or otherwise modify the amplitude of the synchronization pulse, thus severely distorting the television signal viewed by an unauthorized subscriber. This earlier scrambling technique, however, is not as effective when received by the newer digital television receivers which are currently entering the marketplace. Those earlier scrambling techniques, which suppress horizontal synchronization pulses, are not as effective because the newer digital television receivers have a substantially greater horizontal stability. They need only to receive a minor number of correct horizontal sync pulses to still have sufficient information in which to generate a normal stable picture.

Video line inversion techniques have proven to be effective against these newer receivers. However, video line inversion, although providing a highly objectionable picture, nevertheless provides a picture not totally opaque. Consequently, for effective scrambling of the video signal, additional scrambling modes are required to provide total security against unauthorized viewing. This objective, however, must be carried out within the economic confines of keeping the cost of the scrambling system to the subscriber at a minimum.

SUMMARY OF THE INVENTION

It is an objective of this invention to provide multiple scrambling modes to a video signal.

It is a more specific objective of the invention to provide multi-tier broadcast subscription television systems which will address various subscribers or groups of subscribers to authorize or inhibit reception of any tier of broadcast service.

It is yet another objective of the invention to provide for a system which can transmit, along with program video text messages to individual groups of subscribers.

It is a still further objective of the invention to provide features which will inhibit a subscriber from tampering with the decoder or otherwise preventing a system operator from downgrading the reception status of any subscriber.

These and other objectives are provided by a multi-mode scrambling system in accordance with the present invention. The system in accordance with the present invention provides security from unauthorized viewing by digital television receivers, as well as conventional analog television receivers currently used by the present subscribers of pay television signals.

The system in accordance with the present invention provides for baseband video signal scrambling. Each channel of a pay television system may be controlled by the present invention from a central computer. The scrambling of each field of the video signal changes on a per field basis. The control over scrambling may be effected by the operator of the cable system, such that a scrambling sequence may be specified by him during a broadcast.

In a preferred embodiment of the invention, numerous modifications of a standard video signal in either the NTSC or PAL system are effected. The first of these includes modification of the vertical interval of the video signal. When a scrambling sequence is being utilized, the position within the sequence must be known by the receiving television. By inserting at a particular line in the vertical blanking interval, a sync pulse of a predetermined width, the position in the scrambling sequence for the following active portion of the video signal field is identified. Additionally, false or bogus synchronization pulses are added in the vertical interval for the lines of the vertical interval, such that a television set's synchronization will be incorrect when detecting these false or otherwise misplaced horizontal sychronization pulses.

The vertical interval of the video signal is utilized to identify in a receiving decoder the beginning of the field. This is effected by including additional synchronization pulses of a specific width, such that detection of these synchronization pulses will identify for a receiving decoder the beginning of each vertical field.

Additionally, the vertical interval of the video signal contains data. Among the data being transmitted on certain predetermined lines of the vertical interval is a scrambling algorithm selected by the system operator. The scrambling algorithm will identify a particular scrambling sequence in which a plurality of following video signals will be scrambled. Additionally, text data may be transmitted during other lines of the vertical interval, and individually addressed to a subscriber in accordance with a subscriber code.

Additional security provided to the scrambled video signal includes an alternate line inversion of the active portion of the video field following line 21. In this system of scrambling, every other line of a field of the video signal is inverted, the beginning line of the inverted sequence changing per field in accordance with the scrambling sequence.

Prior to transmitting the video signal, the video signal active portion of lines 21 through the remaining field, are compressed, thus giving a false gray scale or luminance level when received by an unauthorized viewer.

Finally, the ultimate objective of total opacity is achieved by providing an offset to the active portion of the video signal. The active portion of the video signal for lines 21 through the remaining portion of the field is set below the horizontal blanking pedestal level, thus being received as a below black level by an unauthorized television receiver. As such, the picture will be blanked off as a result of the bias applied to the video signal.

Other features provided in the preferred embodiment of the invention include addressability for addressing any decoder by sending a decoder and tier number during the vertical interval on a predetermined line of the vertical interval as digital data. A decoder recognizing its own preprogrammed identification number will disable the decoder or enable it, depending upon the data bit occurring with the identification number and the tier number identified. Thus, any tier of broadcast service can be enabled or disabled by the addressable head end system. During a broadcast of a specific tier, those subscribers which are authorized to receive the tier will recognize their identification number, a tier number and an enable or disable command with the tier number, such that their reception is authorized or unauthorized depending upon their account with the system operator.

Additional capability is provided in an embodiment of the invention for sending messages to individually addressed subscribers. By appending a digital text message with each subscriber's identification code, that subscriber may, when recognizing his own identification code, decode the message and store it for presentation on the video screen. Upon selection of a specific display control by a subscriber, the stored message will be displayed.

Another feature possible with a system in accordance with the invention is group addressing, wherein more than one subscriber is identified by a group number such that entire group numbers may be enabled or disabled for a specific tier of broadcast service, or may receive the same message when a group call is effected.

Additional security to the system in accordance with the present invention is provided at the decoder by a tamper proof connection such that if a party attempts to open a decoder box containing the circuitry for decoding the scrambled video signal, a locally generated signal will inhibit the decoder from further operation until the system operator is called for service.

As the present invention is a head-end addressable system, two clocks are provided at each decoder as additional security features. The first is a 96-hour real time clock which is reset whenever the latched clock, described below, is updated. In the event a subscriber attempts to remove his decoder, such as to avoid being disabled by an address disable command from the head-end system, the 96-hour timer will eventually time out as having not been reset by the head-end system, and effect a disable at the decoder which again requires the system operator's cooperation in re-establishing the decoder in an enable condition. The second is a latched clock which the head-end periodicaly updates with a timer refresh number sent out during an ALL-CALL message to all decoders. This keeps the decoders "in time" with the head-end system. In the event a decoder is disconnected or has a power failure, the latched clock will not match with the head-end and all tiering will be shut down in that decoder. In order to re-time the decoder, the timer number in the decoder must be set to zero. This will cause the decoder to "latch" to the next timer refresh number sent from the head-end and the decoder will once again be "in time".

DESCRIPTION OF THE FIGURES

FIGS. 5A and 5B demonstrate the programming steps executed by the microprocessor encoder of FIG. 4.

FIG. 6C is a schematic diagram of the vertical counter for the encoder.

FIGS. 8A and 8B demonstrate the microprocessor and standard cell control for generating the gating signals for processing the signals recieved by the circuitry of FIG. 7.

FIG. 10A is a sync pulse generator for the horizontal timing counter of FIG. 9A.

FIG. 11 is a detailed schematic drawing of the level slicer of FIG. 7.

FIG. 12 is a detailed drawing of the signal composer of FIG. 7.

FIG. 13 shows an outline of the programming steps executed by the decoder microprocessor of FIG. 8A.

DESCRIPTION OF THE PREFERRED EMBODIMENT

Figure 1:
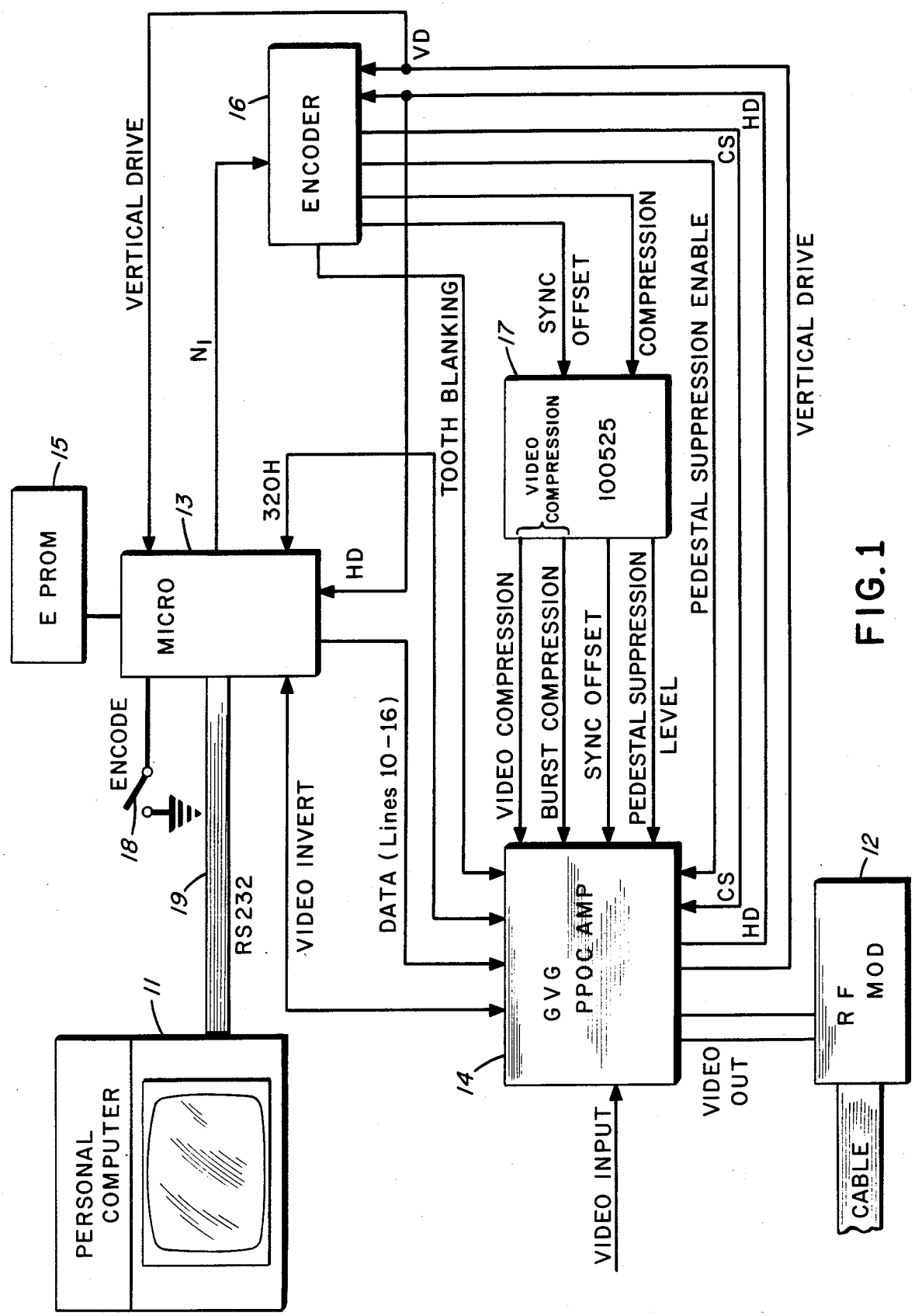
FIG. 1 is a block diagram of the head-end system for a television encoding system in accordance with the preferred embodiment of the invention.

Referring to FIG. 1, there is shown what is generically described as a "head end system" which will provide an addressable video encoding system. As a head end system, the apparatus of FIG. 1 will convert standard NTSC video into an encoded signal which can be transmitted by cable, satellite or by direct broadcast to various subscribers. The system shown in FIG. 1 is capable of individually addressing over 16 million individual subscribers, as well as sending to individual or groups of subscribers text information and tier information relating to classifications of subscription services selected by the subscribers. The system of FIG. 1 is capable of providing 127 such tiers of programming. Additionally, decoders which are utilized by individual subscribers of the system, which employs the head-end apparatus of FIG. 1, can be individually addressed to provide for other control functions such as control of a subscriber's VCR, or sound decoding, or other auxiliary outputs directly addressable by the system operator.

The system, in accordance with FIG. 1, will also permit text to be sent to either groups of subscribers or individual subscribers. Program video signals originated by the head end system are scrambled in accordance with a scrambling algorithm selected by the system operator. The video signal produced from the Grass Valley video processing amplifier 14 of FIG. 1 will be scrambled in several modes, making decoding by even the most sophisticated unauthorized viewer exceedingly difficult. The scrambled signal is modulated on a suitable carrier by RF modulators 12 and sent over a cable system 20 to various subscribers. Although the description of the system will proceed in accordance with system constraints usually found in conventional cable television broadcasting systems, it is clear that the system to be described is usable on other types of signal distribution systems such as DBS, hotels, convention centers, offices, or by satellite channel communication.

Shown in FIG.1 is a host computer 11 which provides the system operator with control over addressing, encoding and text message transmission. The host computer 11 can be an IBM personal computer or any one of a number of other types of computers which have the capacity to store the subscriber identification number inventory, tiers of broadcast levels and sufficient memory to compose text and standard message formats to be transmitted over the broadcast medium.

The host computer 11 will generate message blocks comprising 5 bytes of data. Each of the 5 bytes of data to be transmitted to an encoder microprocessor 13 will identify a message type to be transmitted or executed by the encoder microprocessor 13 of the head end system. Host computer 11 will format 5 bytes of data, including an encoder number as a prefix, and transmit the same over an RS 232 port and communication link 19 to the encoder microprocessor 13.

Shown in FIG. 1 is an apparatus for encoding and transmitting one channel of video signal. It is clear that the host computer 11 can be arranged to communicate with other channels encoded by identical equipment, such that by appending a prefix identifying the channel number to each of the 5 bytes of data transmitted over the RS 232 communication link 19, other channels of encoded video signal may be controlled by the same host computer 11. Additionally, the host computer 11 will format text data and transmit it in blocks of 5 bytes of data which may be sent to either individual subscribers or groups of subscribers, as identified in the 5 bytes of data forming a command. The host computer 11 will, therefore, control the addressing of individual subscribers, the formatting and transmission of text to these individual subscribers as individuals or as a group of subscribers, as well as send data to enable and disable subscribers for various tiers of programming services offered by the system operator.

The basic message types which are composed by the system operator using the computer 11 are shown in the table below:

| Message Type | Bytes | | | | |
|---|---|---|---|---|---|
| | 1 | 2 | 3 | 4 | 5 |
| Short Message Address | 0001+C.S.+ | Address 1 | Address 2 | Address 3 | On/Off 7 Bit Tier |
| Short Message Aux Function | 0010+C.S.++ | Address 1 | Address 2 | Address 3 | Bit0=Aux 1 Bit1=Aux2 Bit2=Aux3 |
| Data Update Long #1 | 1011+C.S.++ | Address 1 | Address 2 | Address 3 | Status Word-See Explanation |
| Data Update Long #2 | 1001+C.S.++ | Tiers 56-63 or 120-127 | Tiers 48-55 or 112-119 | Tiers 40-47 or 104-111 | Tiers 32-39 or 96-103 |
| Data Update Long #3 | 0111+C.S.++ | Tiers 24-31 or 88-95 | Tiers 16-23 or 80-87 | Tiers 8-15 or 72-79 | Tiers 0-7 or 64-71 |
| Mode Line All Call | 1010+C.S.+ | Scramble Mode | Countdown | Program Tier | Timer Refresh |
| All Call Group | 0100+C.S.+ | Bit0=0GRP Bit1=1 Tier | Unused | Group Number | On/Off 7 Bit Tier # |
| Message Data Instruction | 0101+C.S.+ | See Explanation | See Explanation | See Explanation | See Explanation |
| Short Message Category | 0011+C.S.+ | Address 1 | Address 2 | Address 3 | Group Number |

The message type is defined by an instruction number appearing in column 1 of the message formats. A check sum number appears with the instruction number. Columns 2, 3 and 4 identify the data content of the remaining 3 bytes, and the 5th column designates a control function to be executed by a decoder which receives the message.

The first message of the message format types is designated a SHORT MESSAGE ADDRESS. The SHORT MESSAGE ADDRESS is identified by an instruction number in column 1. The instruction number, including a check sum number which the encoder will use to validate the received instruction, contains a separate subscriber identification number in three bytes of a video signal. The SHORT MESSAGE ADDRESS, comprising the 5 bytes of information, may be transmitted during any line of lines 10 through 16 of the video signal. The encoder microprocessor 13, when receiving the 5 bytes of data, will buffer the data and transmit it to the process amplifier 14 for transmission to the subscribers during one of the aforementioned lines of the video signal. The SHORT MESSAGE ADDRESS shown will provide for the addressing of one of the subscribers, identifying each of the subscribers as being either authorized or unauthorized to receive a tier of broadcast service. A tier of broadcast service is identified along with the authorized or unauthorized status of the addressed subscriber by the 5th byte of the message. The 5th byte of the message includes one bit for an on/off indication, signifying authorized/unauthorized status as well as 7 remaining bits identifying the tier number of broadcast service associated with the on/off command. Decoders receiving the SHORT MESSAGE ADDRESS, identified by one of the addresses contained in the SHORT MESSAGE, will be enabled or disabled according to the 5th byte tier information.

The SHORT MESSAGE AUXILIARY FUNCTION will also address a subscriber in a given line of lines 10 through 16. The SHORT MESSAGE AUXILIARY FUNCTION will provide for an enabling of any one of three auxiliary outputs of an addressed decoder. The three bits of the 5th byte of the message identifies the status of an address decoder AUXILIARY 1, AUXILIARY 2 and AUXILIARY 3 function.

The next three long instructions will provide for a single message, segmented into three (3) separate 5 byte lengths. Using the LONG MESSAGE data update, it is possible to address individual subscribers and authorize them for up to 127 tiers of broadcast service. An addressed decoder, upon receiving the first 5 byte message, indicating that two more segments are to follow in two more consecutive lines of video signal, can identify any of the 127 tiers for which individual subscribers are to be authorized or unauthorized for reception and decoding purposes. With the three LONG MESSAGEs it is possible for the system operator to control and continuously update and change subscriber tier authorization for all tiers, depending upon the tier service purchased by the subscriber.

The MODE LINE ALL CALL MESSAGE is sent during an actual TV scrambled broadcast on line 10 of each field of the scrambled broadcast. The MODE LINE ALL CALL MESSAGE identifies the particular program tier being transmitted, a scramble algorithm, a countdown number indicating the next field in which a new scramble mode is to be utilized and a timer refresh function. This message controls the descrambling unit of the subscriber's decoder, permitting him to know in advance the scrambling sequence of the signal being transmitted. The scramble mode byte, byte 2 of the message, will identify the scrambling sequence of each field of a video signal being received by the subscriber. A countdown number will indicate the number of fields remaining in which a new scramble mode byte is to be utilized for decoding. Thus, when the system operator changes his scramble mode by inserting in computer 11 a new scrambling algorithm, computer 11 when instructing encoder microprocessor 13, will identify the number of the subsequent field on which the new scramble mode algorithm is to be effective. The encoder microprocessor 12 will transmit the countdown number which changes each field to the decoders to permit a synchronous change in scrambling mode to be made between decoder and system encoder. Therefore, during the broadcast of an encoded program tier, each field will result in a new countdown number, one less than the previous, transmitted to the decoders which will enable the subscriber decoders to change over to the new scramble mode upon a countdown number of zero being received.

Additional to bytes 2 through 4, a 5th byte of information sent during line 10 of each encoded video signal broadcast, will indicate a timer refresh number. The timer refresh is a part of the overall system security, which will result in a timer at the subscriber's decoder being updated on a regular basis. The timer refresh number need not be transmitted every message, but only on a periodic basis to the subscribers. This timer refresh funciton is utilized to inhibit a subscriber from disconnecting his decoder in an attempt to inhibit program tier information from being downgraded. At the end of a subscription expiration period, the subscriber could not merely disconnect his decoder such as to prevent the head end from disabling a previously subscribed-to-program tier. In the event a subscriber does disable his decoder by either removing it from the communication receiving channel or attempting to trap out the head end originated messages, which would disable tier reception, a timer internal to the decoder would not be periodically updated or refreshed. Upon reconnection of the decoder, the time stored in the timer in the decoder is compared with the timer refresh number and in the event a disparity exists between the two, indicating a disconnection, decoding will be inhibited.

The ALL CALL GROUP instruction will identify groups of subscribers by a group number in byte number 2, which are authorized to decode a particular broadcast tier. The 5th byte contains the on/off command for the group, and a 7 bit tier number identifying the tier that subscribers will be authorized to decode.

The remaining two message formats relate to the transmission of message data which may be sent to individual subscribers or groups of subscribers by the system operator. The MESSAGE DATA instruction includes, in bytes 2 through 5, up to 3 alphanumeric characters which may be transmitted each line. Three lines per field are available for this text transmission, permitting up to 540 characters per second to be transmitted.

The foregoing message types are transmitted over an RS 232 communication link to the encoder microprocessor 13. The encoder microprocessor 13 will receive and acknowledge commands from the incoming RS 232 communication link. The encoder microprocessor 13 includes a buffer RAM which will decode and store messages received from the computer 11. The encoder microprocessor 13 is timed by a Vertical Drive (VD) signal, horizontal drive (HD) signal, and by a 320H signal received from the Grass Valley process amplifier 14. The encoder microprocessor 13 will, by receiving the standard Vertical Drive, Horizontal Drive and clock signal 320H from the Grass Valley process amplifier, know the beginning and end of each line of video signal 14, and will therefore be able to count each line of the video signal. The data which has been received and stored in the microprocessor 13 buffer RAM and which is to be transmitted as messages to the various subscribers, will be supplied to an output latch during the appropriate lines 10 through 16, as determined from the Grass Valley reference signals.

The commands to be transmitted are serialized by the encoder microprocessor 13 and supplied during lines 10 through 16 of the video signal to the Grass Valley process amplifier 14. The Grass Valley process amplifier 14 includes a data input which will transmit on selected lines when receiving any data information as a change in video signal level representing a 1 or 0 bit of a message byte.

An EEPROM 15 associated with the encoder microprocessor is periodically written with the current algorithm number, countdown number and tier number being broadcast by the head end system. As such, in the event of a failure of the system, there will be stored in the EEPROM 15, the system operating conditions at the time of the failure. Such failures, although infrequent, will occur due to lightning or power failures to the head end system. At the time power is restored to the system, the EEPROM 15 contents will be retrieved by the encoder microprocessor and system operation may commence from the time the system was interrupted.

An additional function performed by the encoder microprocessor 13 is decoding the scrambling algorithm received from the host computer. The scrambling algorithm will define 16 possible scrambling sequences of the video signal. These 16 possible scrambling sequences are identified by a bin number, N1. The encoder microprocessor 13 will determine from the algorithm number a bin number defining the current scrambling sequence for the field of the video signal being currently broadcast. This bin number is output by the microprocessor 13 to the encoder 16. The encoder 16 will, between lines 11 through 17 of the video signal, generate a pulse of specific duration and insert it at a position in lines 11-17 corresponding to N1. The decoder of each subscriber will detect the position of this pulse and identify the bin number N1. In combination with the scrambling algorithm transmitted during a MODE LINE ALL CALL command, N1 will determine the particular sequence of scrambling of the current field being transmitted.

Before proceeding to a detailed description of the encoder microprocessor 13 operation for generating a scrambling sequence, and to a description of the encoder 16 timing circuitry utilized to generate the scrambled video signal, a review of the nature of the encoded video signal will be described.

Figure 2:
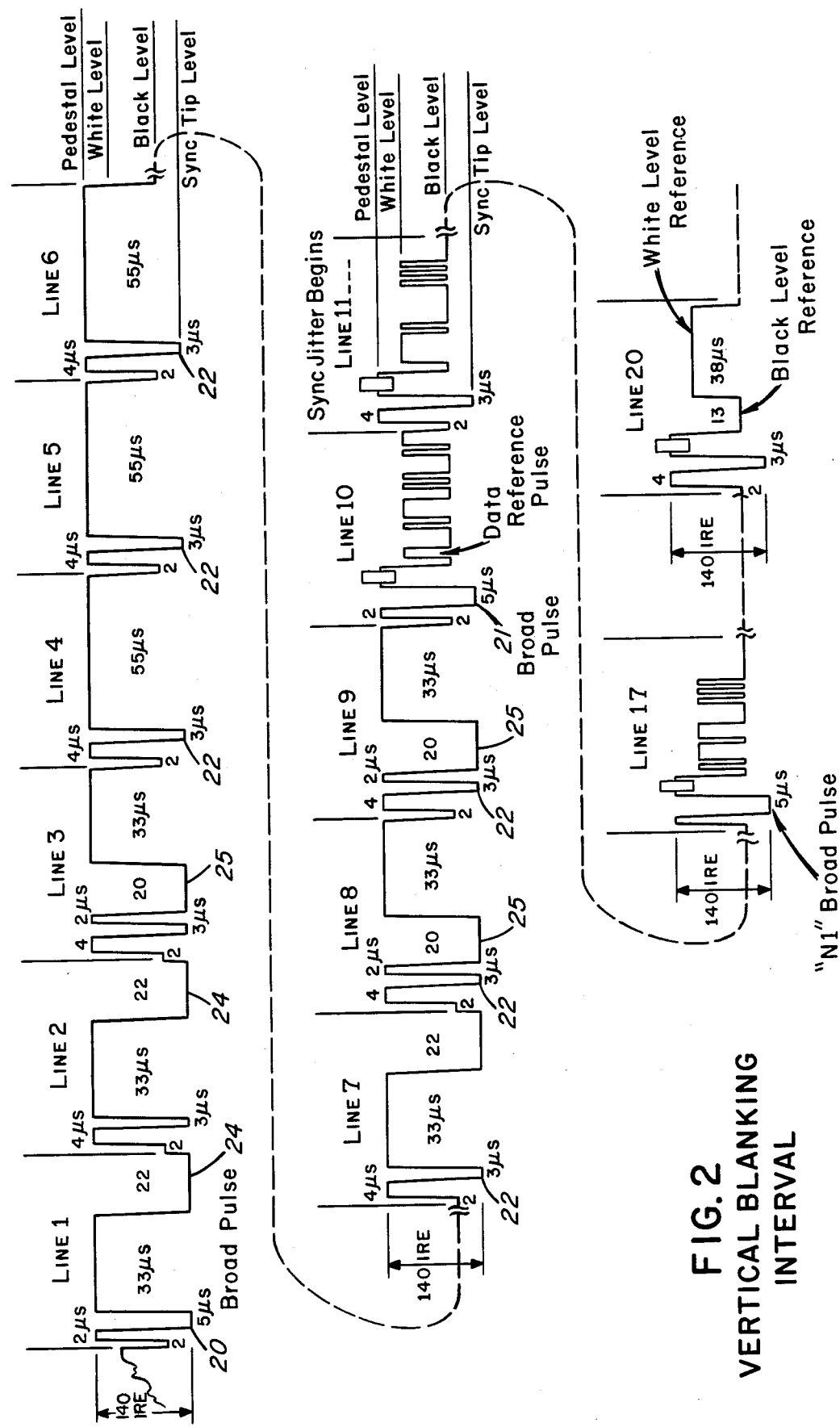
FIG. 2 demonstrates the vertical blanking interval of a signal produced by the head end system of FIG. 1.

Referring now to FIG. 2, the vertical interval of the video signal encoded in accordance with the present invention is shown. At line 1 of the encoded video signal, there is a broad sync pulse 20 having a duration of substantially 5.0 microseconds. At line 10 of the vertical blanking interval, a similar broad synchronization pulse 21 of equal duration is also provided. The remaining synchronization pulses inserted between lines 1 and 10 have a duration of 3.0 microseconds.

The normal equalization pulses and serration pulses found in standard NTSC video signals have been compressed as shown. Additionally, the position of the sync pulses is changed from conventional video signal format. During the vertical blanking interval the sync pulse 22 for the lines occurs at substantially 4 microseconds after the beginning of the front porch of the horizontal blanking period.

The vertical blanking interval in accordance with FIG. 2 will therefore contain synchronization pulses which are misplaced from the normal video, and the equalizing and serration pulses normally present are substantially compressed so as to appear removed. Additionally, the vertical blanking interval contains pulses for lines 1, 2, 3, 7, 8, and 9 broader in width than the remaining video signal pulses of the vertical blanking interval. These broader pulses 24 and 25 are inserted at lines 1, 2, 3, 7, 8, and 9 in order to avoid any problems with AGC stabilization of television receivers which receive the scrambled vertical blanking interval. As the vertical sync pulses have been compressed along with the narrow sync pulses, an unstable AGC voltage may be developed in many television receivers. The problem is corrected by inserting the wide pulses shown at lines 1, 2, 3, 7, 8, and 9. These pulses correspond to an offset of the video signal. The first of these pulses represents an offset of the second half of line 1, the second represents an offset of the second half of line 2, and the third represents an offset of the first half of line 3. In the second equalization period of the vertical blanking interval defined by lines 7, 8 and 9, the 7th line is offset during the second half, the 8th and 9th lines are offset during the first half thereof. Television receivers receiving the signal having the vertical blanking interval in accordance with FIG. 2 will not have the AGC stabilization problems accompanying the removal of the equalization pulses, serration pulses and the narrower sync pulses.

The bin number encoding, N1, which defines one of a plurality of scrambling sequences to be utilized during the field being currently transmitted by the head end system, is placed in the vertical blanking interval at a line between lines 11-17. The position of the N1 pulse which has a duration of 5.0 microseconds corresponding to the width of pulses appearing at lines 1 and 10, will correspond to an N1 number which the receiver decoding circuitry will utilize in establishing which bin of a particular scrambling algorithm contains the video signal field scrambling sequence. The N1 broad pulse is shown in FIG. 2 at line 17.

FIG. 2 also illustrates data which is sent during lines 10-16. These lines of the video signal contain serialized data received from the encoder microprocessor 13 for transmission. Additionally, line 20 contains a reference black and white level which the subscriber decoders will utilize in restoring the encoder video signal.

A type of video signal scrambling employed by the present invention provides alternate line inversion between fields. With this mode of scrambling, every other line of a video signal is inverted, with the starting line for the inversion sequence changing between fields. The scrambling algorithm and bin number defines the beginning line of each field which will start the sequence of alternate line video inversion. In the present embodiment, this alternate line video inversion starting line has been confined to lines 22 and 23. Thus, on a pseudo-ransom basis, an alternate sequence of inverted lines will occur beginning at either line 22 or line 23, selected on the basis of the scrambling algorithm, and the bin number for that scrambling algorithm. Each of the plurality of bin numbers associated with an algorithm defines a beginning line at which the alternate line inversion is to commence. Thus, when the receiver knows the scrambling algorithm by decoding data during line 10 of the data insertion of the video signal, and knows N1 corresponding to a bin number for the algorithm, by detecting the next insertion of a broad sync pulse following line 10, it knows the beginning line for that field in which alternate line inversion is to take place. Shown in FIG. 3, along with normal video, is an alternate inversion pattern of lines following either line 23 or 22 for the entire remaining field. The alternate line inversion sequence is similar to that described in U.S. Pat. No. 4,396,947.

Figure 3:
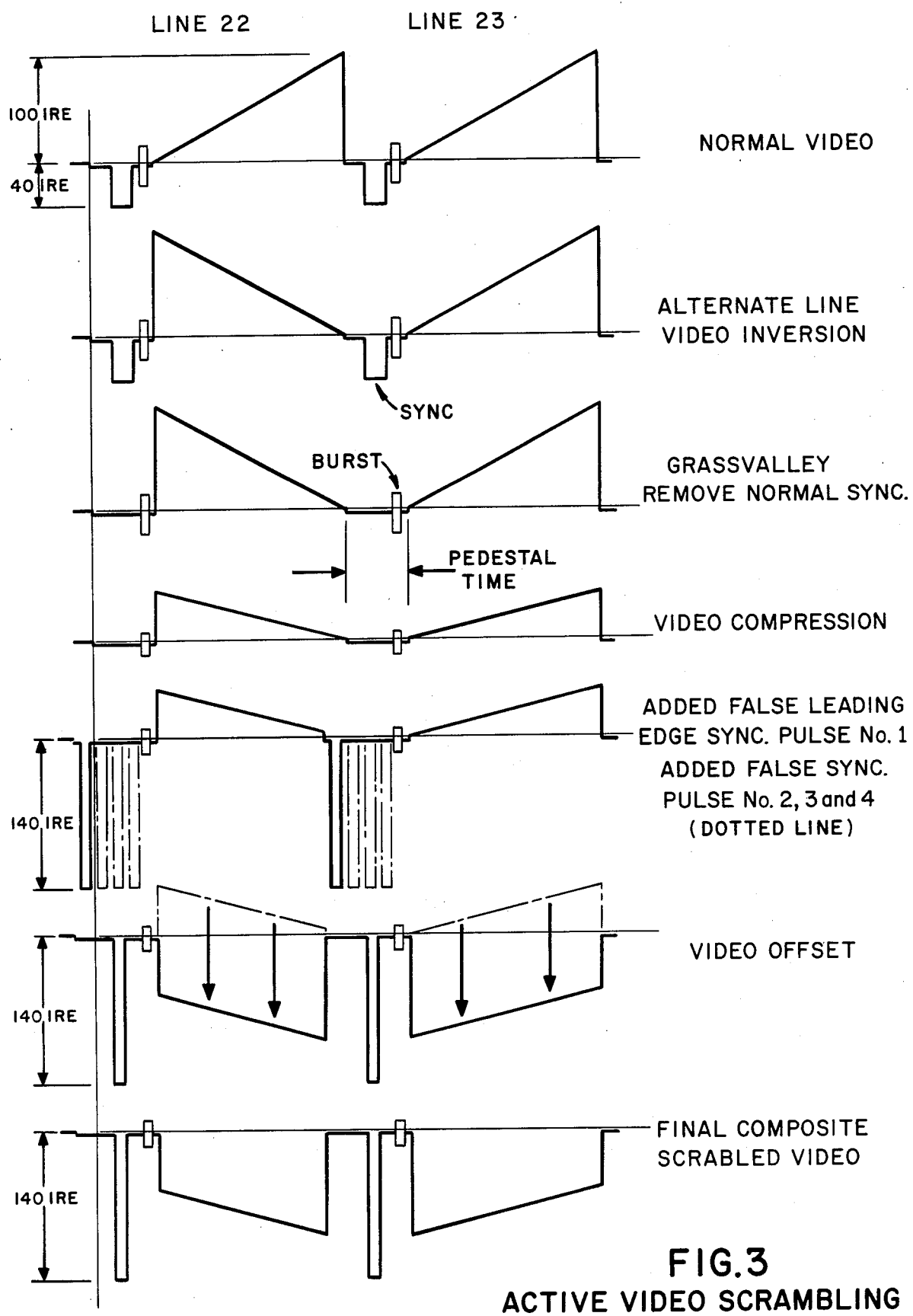
FIG. 3 demonstrates the scrambling of the active portion of each field of the video signal in accordance with the head end system of FIG. 1.

Continuing with FIG. 3, there are shown three additional scrambling modes for the video signal for the remainder of the field in accordance with the present invention. Prior to scrambling, the process amplifier 14 removes the sync information from the inverted video. The first of these scrambling modes includes video compression wherein the normal 140 IRE video signal is compressed to approximately one half its normal value by an attenuator associated with the Grass Valley unit. The attenuator is set by microprocessor output indicating that encoding is to be done. As presently contemplated, the video compression is constant for all video fields, however, it should be appreciated that the video compression may change between fields in accordance with a scrambling sequence as do other parameters of the video signal. Two video compression lines are shown as the Grass Valley process amplifier 14 utilizes two amplifiers to control gain. One of the amplifiers controls the burst signal magnitude, while the remaining amplifier controls the active video signal amplitude.

Additionally, shown in FIG. 3 are synchronization pulses which have a length exceeding those of normal video by 100 IRE units as well as a position in the horizontal blanking interval which is different from normal video. One of the scrambling techniques contemplated in accordance with the present invention is to both lengthen the horizontal sync tip as shown, as well as place the horizontal sync pulse in at least four distinct positions of the video signal. These positions are shown as being 1 microsecond after the beginning of the front porch portion of the normal video signal, a second intermediate position of approximately 2.6 microseconds from the front porch, a third position of approximately 4.2 microseconds from the front porch, and a fourth at approximately 5.8 microseconds from the front porch. The entire field of a video signal is transmitted, having a false leading edge sync pulse in one of the four positions shown, followed by a subsequent field in the remaining positions shown. Thus, for each field of video signal received, the position of the false synchronization pulses will change.

It should be noted, however, that during the vertical interval of all fields, the false sync pulses remain in the same position and do not change between fields. The effect of having the false sync pulses in he video signal is to produce, on a conventional television receiver, a picture which is difficult to view as the picture suffers a violent horizontal jitter among images of the picture to produce an aliasing effect.

Additional to the foregoing modes of scrambling, the entirre video signal is offset with a DC level with respect to black level such as to put most of the active portion of the video signal, i.e., that portion appearing after the vertical interval, below a level (black) which will produce illumination on the television receiver picture tube. As such, the video offset will maintain the picture black. Although the preferred embodiment maintains the video offset constant, it would of course be possible to change the video offset between fields or on a time variant basis.

Having thus described the format of the scrambled signal which is generated by the head end system of the present invention, the encoder circuitry which will reformat the normal video program signal into the aforesaid scrambled video signal will be described.

Referring once again to FIG. 1, there is shown an encoder 16 which will generate those pulses shown in the vertical and horizontal blanking intervals of the scrambled video signal and scramble the signal by video compression, alternate line inversion, and video offset. The Grass Valley process amplifier 14 removes the normal horizontal blanking information including sync pulse and DC pedestal level, while maintaining the active video portion describing the picture detail, along with the color burst signal intact as shown in FIG. 3. The encoder 16 shown in FIG. 1 will generate synchronization timing pulses to insert the synchronization pulses in the proper place, as measured from the vertical drive (VD) and horizontal drive (HD) signal received from the Grass Valley process amplifier 14. Additionally, the DC level of the video signal during pedestal time is controlled by a sync offset output from the encoder 16. Thus, the encoder 16 defines the beginning and end of pulses appearing during the vertical blanking interval, shown in FIG. 2 as pulses CS, as well as the level of these pulses with SYNC OFFSET. Additionally, the encoder circuit 16 will generate, at precisely timed locations, the beginning and end of the broad sync pulses for lines 1, 10, and N1, as well as the narrow and broad sync pulses 24–25 of FIG. 2 for the vertical blanking period on the line designated CS.

The bogus sync pulses hwich were inserted in accordance with FIG. 2 at positions in the horizontal blanking interval for different fields are also generated by the encoder of FIG. 1. The encoder of FIG. 1 provides these gate signals as CS to the Grass Valley processing amplifier 14 to begin and end pulses occurring during the vertical blanking interval and horizontal blanking interval (pedestal time), as well as determining the levels of the video signal produced by the process amplifier.

To effect video line inversion, microprocessor 13 will provide an INVERT pulse to the Grass Valley process amplifier 14 when a line is to be inverted.

Associated as an interface 17 between the encoder 16 and the Grass Valley process amplifier 14 is a circuit which, when an encoded signal is to be transmitted, reduces the gain of the two amplifier sections of the Grass Valley unit to compress the video signal. These two amplifier sections correspond to one amplifier carrying the active video and a second amplifier carrying the burst signal which are combined to provide the composite video signal. The interface circuit 17 will reduce the gain of these two amplifier sections, thereby providing the compressed video as shown in FIG. 2. Additionally, an input of the Grass Valley unit is provided to change the amplitude of pulses with sync offset, as well as a pedestal offset for defining the signal level during horizontal blanking. Thus, the longer than usual horizontal synchronization pulses can be formed by suppressing the pedestal level and lengthening the sync pulse tips. The broader than usual horizontal synchronization pulses, and any other pulses to be added to the video signal are identified by CS. The video offset supplied to the video signal is internal to the Grass Valley unit and is set up to be constant.

Having now made a general description of the head end system for the present invention, a detailed description of the encoder microprocessor 13 will be made.

Figure 4:
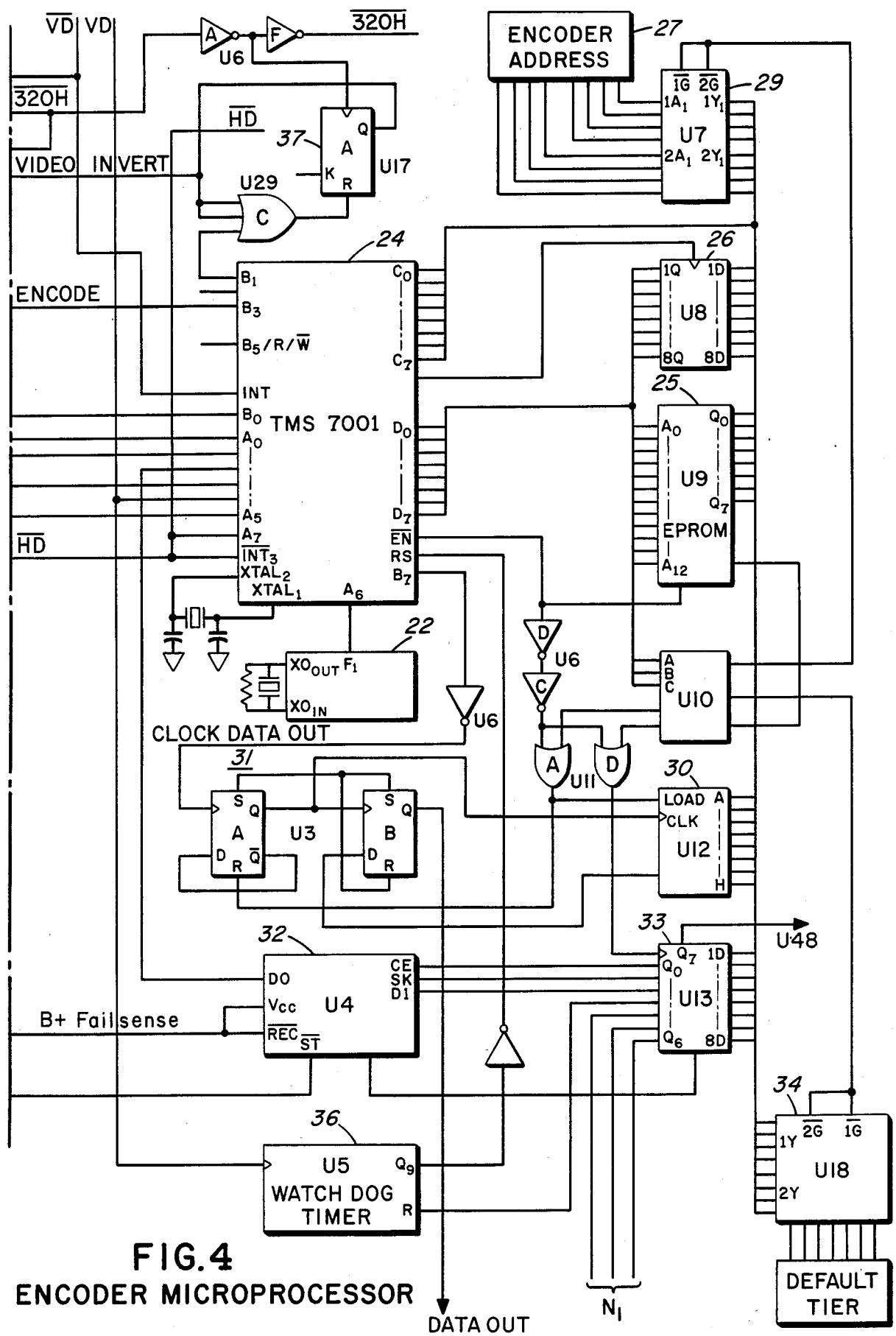
FIG. 4 is a more complete diagram of the encoder microprocessor of the head end system of FIG. 1.

Referring to FIG. 4, there is shown the general architecture of the encoder microprocessor. The encoder microprocessor receives inputs on inputs A0–A5, the RS 232 communication link, as well as vertical drive (VD) and horizontal drive (HD) signals and a 320H signal from the Grass Valley unit, thus permitting timing of the microprocessor with respect to the video signal being generated. An ENCODE ENABLE signal is received from a switch closure 18 of FIG. 1 when a given broadcast is to be encoded to provide an ENABLE signal to the microprocessor port B3.

The microprocessor unit 24 is a TMS 7001 8 bit microprocessor. The microprocessor 24 has associated with it a baud rate generator 22 which generates a clock signal. The microprocessor interfaces with the RS 232 communication link, utilizing this clock signal.

An EPROM 25 is shown which contains software to be described for reading in data from the RS 232 link, formatting data for transmission during lines 10 through 16 of the video signal, as well as computing the N1 number associated with a descrambling algorithm to be sent during each vertical field.

An address latch 26 is also included to provide for a 16 bit wide address to the EPROM. Thus, by first loading 8 bits of address data in the address latch 26, and outputting the remaining address data bits from the microprocessor 24, it is possible to address the 16 address inputs for the EPROM 25.

In the event that more than one channel is to be encoded, each encoder will have its own address as identified by the thumb wheel switch 27, and a corresponding output latch 29 connected thereto. Thus, as was mentioned with respect to the computer 11, each encoder may be addressed over the RS 232 port by placing ahead of each 5 byte packet of data a preamble identifying the encoder address for which the data is destined.

Associated with the microprocessor unit 24 is a serializer 30 which, when data is to be transmitted during lines 10 through 16 by the microprocessor to the Grass Valley Unit, will serialize the data and clock it during the selected line onto the video signal. Clocking is provided by the B7 output of the microprocessor 24, through a pair of flip flops 31 as shown. The flip flops 31 will cause the serializer 30 output to be clocked at a data rate which will result in 8 bytes being transmitted during one selected line of the field. Also associated with the microprocessor unit 24 is an EEPROM 32 which stores the last algorithm to be transmitted as well as a tier number and other data of a MODE LINE ALL CALL signal to be transmitted by the head end system. In the event of a power failure, the B+ fail sensing line for the EEPROM 32 will store the most recent data written in the EEPROM 32 for use when the system is reactivated. An output latch 33 is associated with the EEPROM 32 to interface its contents with the microprocessor bus.

A watch dog timer 36 is provided which counts VD pulses. The watch dog timer is periodically reset by the microprocessor 24 software. The watch dog timer 36 in the event of a system malfunction will time out and reset the microprocessor 24.

When inversion of the video signal is to be effected, output B1 of the microprocessor 24 will reset flip flop 37 each time a new line is to be inverted.

Finally, in association with the encoder microprocessor is a default tier data switch 34. In the event that no tier information is available, the 8 position switch 34 will generate a default tier to prevent a situation where no tier data is transmitted during an ALL CALL MODE command.

Prior to beginning the detailed discussion of the programming instructions executed by the encoder microprocessor 24, generation of a scrambling sequence will be described. The scrambling algorithm, having previously been selected by an operator, will be reordered in the subscriber's decoder to define in a preferred embodiment of the invention, 16 rows or bins of a reordering matrix for the scrambling algorithm. The reordering matrix reorders the bits of the scrambling algorithm byte into the 16 different rows or bins. A number N1 will identify which row of the reordering matrix is to be utilized for a field of the video signal. Thus, along with transmitting the scrambling algorithm to the receiver decoders of the system subscribers, a number N1 must be sent identifying which of the 16 bins is to be utilized for each field. As was mentioned with respect to the description of the vertical interval of the scrambled signal, this number N1 is sent as a wide horizontal sync pulse during lines 1 through 17. The particular line at which the wide sync pulse is transmitted is identified in the receiver decoder as the line number corresponding to the number N1.

The encoder microprocessor therefore must compute values of N1 to be sent for each succeeding field of the video signal for the selected scrambling algorithm and output the value of N1 in latch 33. The encoder microprocessor carries out this computation as shown in the following example.

The scrambling algorithm is made up of eight (8) bits numbered from seven (7) to zero (0), left to right, as follows:

| Bit # | 7 6 5 4 3 2 1 0 |
|---|---|
| Algorithm | 0 0 0 1 0 0 1 0 |

| | RE-ORDERING MATRIX | | | | | | | |
|---|---|---|---|---|---|---|---|---|
| Reordered Bit# | 7 | 6 | 5 | 4 | 3 | 2 | 1 | 0 |
| BIN # 1 | 0 | 3 | 2 | 6 | 7 | 5 | 4 | 1 |
| 2 | 5 | 7 | 0 | 3 | 4 | 6 | 1 | 2 |
| 3 | 5 | 5 | 1 | 1 | 2 | 6 | 7 | 3 |
| 4 | 2 | 3 | 2 | 6 | 1 | 7 | 4 | 2 |
| 5 | 4 | 7 | 2 | 4 | 1 | 4 | 7 | 5 |
| 6 | 4 | 7 | 3 | 0 | 4 | 3 | 4 | 6 |
| 7 | 0 | 6 | 6 | 6 | 7 | 7 | 2 | 3 |
| 8 | 4 | 0 | 3 | 0 | 7 | 4 | 1 | 1 |
| 9 | 3 | 2 | 0 | 2 | 0 | 0 | 6 | 1 |
| 10 | 5 | 4 | 1 | 3 | 0 | 3 | 6 | 6 |
| 11 | 6 | 3 | 1 | 5 | 4 | 5 | 0 | 4 |
| 12 | 4 | 2 | 0 | 4 | 6 | 1 | 4 | 5 |
| 13 | 5 | 5 | 5 | 0 | 2 | 6 | 6 | 2 |
| 14 | 0 | 0 | 6 | 5 | 2 | 5 | 3 | 1 |
| 15 | 3 | 4 | 6 | 4 | 5 | 6 | 7 | 2 |
| 16 | 6 | 1 | 2 | 0 | 7 | 0 | 5 | 4 |

This reordering matrix will reorder the bits of the scrambling algorithm in the following fashion:

Using the above algorithm (00010010) we see that the bit in the bit #7 position is a zero. Bin #1 of the matrix says that the reordered bit #7 will be the same bit as that in the original bit #0 position, the bit #6 will be the same as that in the original bit #3 position and so on through the eight positions. This will give a new algorithm of 00000011. In the same way, each of the other fifteen bins will produce new algorithms. The following chart shows all sixteen reordered algorithms:

| | Original Algorithm 00010010 | | | | | | | | |
|---|---|---|---|---|---|---|---|---|---|
| Bit No. | 7 | 6 | 5 | 4 | 3 | 2 | 1 | 0 | Line Inversion |
| BIN # 1 | 0 | 0 | 0 | 0 | 0 | 0 | 1 | 1 | 22 |
| 2 | 0 | 0 | 0 | 0 | 1 | 0 | 1 | 0 | 23 |
| 3 | 0 | 0 | 1 | 1 | 0 | 0 | 0 | 0 | 22 |

-continued

| | Original Algorithm 00010010 | | | | | | | |
|---|---|---|---|---|---|---|---|---|
| Bit No. | 7 | 6 | 5 | 4 | 3 | 2 | 1 | 0 | Line Inversion |
| 4 | 0 | 0 | 0 | 0 | 1 | 0 | 1 | 0 | 23 |
| 5 | 1 | 0 | 0 | 1 | 1 | 1 | 0 | 0 | 23 |
| 6 | 1 | 0 | 0 | 0 | 1 | 0 | 1 | 0 | 23 |
| 7 | 0 | 0 | 0 | 0 | 0 | 0 | 0 | 0 | 22 |
| 8 | 1 | 0 | 0 | 0 | 0 | 1 | 1 | 1 | 22 |
| 9 | 0 | 0 | 0 | 0 | 0 | 0 | 0 | 1 | 22 |
| 10 | 0 | 1 | 1 | 0 | 0 | 0 | 0 | 0 | 22 |
| 11 | 0 | 0 | 1 | 0 | 1 | 0 | 0 | 1 | 23 |
| 12 | 1 | 0 | 0 | 1 | 0 | 1 | 1 | 0 | 22 |
| 13 | 0 | 0 | 0 | 0 | 0 | 0 | 0 | 0 | 22 |
| 14 | 0 | 0 | 0 | 0 | 0 | 0 | 0 | 1 | 22 |
| 15 | 0 | 1 | 0 | 0 | 0 | 0 | 0 | 1 | 22 |
| 16 | 0 | 1 | 0 | 0 | 0 | 0 | 0 | 1 | 22 |

The N1 number identifying the bins is computed by summing the digits contained in the zero, first and second bit positions of each reordered bin of the scrambling algorithm. If the decoder of a subscriber detects an N1 of 3, he can identify that as corresponding to bin number 1 and begin descrambling in accordance with the code of bin number 1 as reordered.

As is seen from the reordered scrambling algorithm, more than one bin number may correspond to a particular N1 value. If the decoder receives an N1 of 2, and finds that the succeeding N1, for a succeeding field is not zero, as would be expected, the decoder will look ahead to find the first of the expected N1 numbers and compare the next N1 number for the subsequent field when received. Thus, if the decoder fails to match two consecutive N1 numbers with a selected position in the reordered scrambling algorithm matrix, it will jump ahead until a match between consecutive N1 numbers transmitted is obtained and the receiver decoder is synchronized with the transmitter encoder. Once synchronized, the decoder will track for each field transmitted the new N1 number, identifying a bin number containing the scrambling sequence for the video signal. The sixteen scrambling sequences are repeated for every additional 16 fields.

Having now computed the N1 numbers for the reordered scrambling algorithm, the encoder microprocessor 24 will begin scrambling of the field of video signal in accordance with the reordered scrambling algorithm. In a preferred embodiment of the invention, the third bit of the reordered scrambling algorithm defines whether or not video line inversion is to begin on lines 23 or 22. Thus, for each field of the video signal, a scrambling sequence of alternate inverted lines will begin, depending upon the value of the bit appearing in the third bit position of the reordered scrambling algorithm. Thus, for one example of the invention, scrambling may commence at the encoder by beginning alternate line inversion on line 22 in accordance with the value of the third bit position of bin number 1. During the vertical interval for this first field of video signal scrambling, data will be written by microprocessor unit 24 into latch 33 identifying that a broad sync pulse will be sent during line 13 of the video signal. This line 13, identifying N1 as equal to 3, when received by the decoder, will point the decoder to bit number 1. As bin number 1 contains in the third bit position of the reordered scrambling algorithm a zero, the decoder knows which of lines 23 or 22 to begin scrambling. In the next succeeding field of the video signal, the encoder will have sent a broad sync pulse at line number 12, identifying this as bin number 12. The decoder, having found a match between the first and second consecutive received N1 numbers, will begin alternate line inversion at line 22 as bin number 2 identifies the third bit of the reordered scrambling algorithm as a 0, corresponding to a beginning inversion line of line 22.

Although in the presently preferred embodiment of the invention the scrambling mode selected has been alternate line inversion, the beginning line of each field of the video signal of the inversion pattern changing in accordance with each bin of the reordered scrambling algorithm, it is clear that other scrambling modes may be implemented and identified by each reordered scrambling algorithm. For instance, other bits of the reordered scrambling algorithm could identify other portions of the signal to be altered such as video compression, which is now held fixed. With the foregoing system of scrambling a video signal, added security to the system is obtained as the scrambling algorithm, transmitted as data during line 10 of the video signal, is not sufficient by itself to determine at the receiver decoder the scrambling pattern for the following field. Thus, in order to decode applicant's signal, it is necessary not only to identify the scrambling algorithm, but to detect a value of N1 to identify one of 16 bins of a reordering matrix. Only after the scrambling algorithm is reordered in accordance with the bin number may the true identity of a scrambling sequence of a given field be known.

Encoder Microprocessor Programming

Figure 5B:
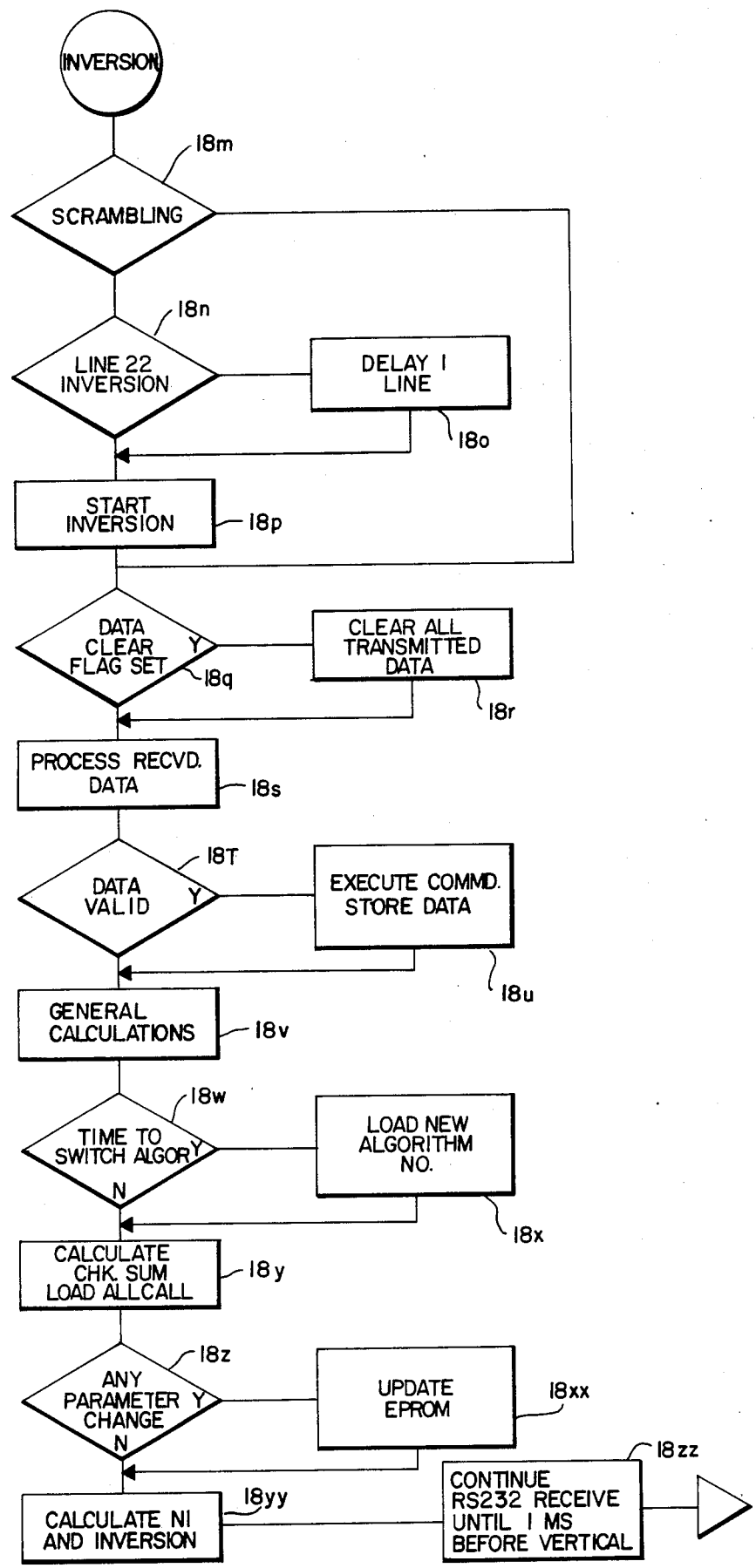

Referring now to FIGS. 5A and 5B, there is shown a flow chart describing the programming steps executed by the encoder microprocessor 13. The beginning of the program is, of course, as is usual in microprocessor control systems, denoted by the beginning of the reset of the system upon power up. At this time, the microprocessor will, in step 18a, clear the internal RAM and initialize the ports to be compatible with the RS 232 input, as well as be correctly formatted to receive the timing signals from the Grass Valley unit. The program will, upon a power up condition, read the EEPROM 32 for the last default condition, where the system went down because of power or other system failure, causing the data being transmitted such as the scrambling algorithm, the command type, and any data which was sent just prior to the loss of power, to be recalled for the microprocessor. Step 18b will read this data into the microprocessor, permitting the status of the system to return to a condition as before the failure.

The next portion of the program describes the steps which are carried out in accordance with the vertical sync timing received from the Grass Valley unit. The microprocessor operates on a cycle defined by the vertical synchronization periods of the video signal. All remaining subroutines are executed during the vertical sync interval, and timing commenced such that data insertion and video signal scrambling may be synchronized with the video signal to be transmitted.

During this vertical synchronization period 18c, the microprocessor will count the lines of the video signal in step 18d and quickly establish a flag to indicate which field is currently being transmitted by the Grass Valley unit. In the NTSC system, the field may be either field 1 or field 2, as determined by counting the number of lines in each field. Additionally, the watch dog timer 36 associated with the microprocessor is reset at the beginning of each field in step 18d.

At the beginning of each field, as determined from the vertical drive (VD) signal received from the Grass Valley unit, individual lines are counted by counting horizontal drive (HD) pulses from the grass valley unit and, upon detecting the presence of line 3, the RS 232 port is checked in step 18f. The RS 232 port connecting the encoder microprocessor to the host computer is asynchronous to all other timing of the system. Data can be received once per millisecond and therefore the RS 232 is sampled on a 2 millisecond interval to prevent the loss of any information. In the event that the RS 232 input, upon being sampled, detects incoming data, the character is stored in the buffer RAM of the microprocessor in step 18e and the character echoed back over the RS 232 line in accordance with the known format.

Decision block 18f, in the event the RS 232 input has no data to be transmitted, will proceed to step 18g which is an idle for the microprocessor program execution. At least two line periods are used as a delay from checking of the RS 232 port, before the data transmission will begin. In step 18h, the microprocessor software is synchronized to the horizontal drive pulses received from the Grass Valley unit.

Now that the microprocessor has been synchronized, when line 10 is counted by the microprocessor, the data stored in the buffer as received from the RS 232 unit, is formatted and inserted during the lines 10 through 16 of the video signal in step 18I. Data received over the RS 232 port, upon decoding, is loaded in the 5 bytes per line format transmitted by the RS 232 port.

Upon the completion of execution of a data output function during lines 10–16, wherein the data is sent to the serializer and output on lines 10–16 of the video signal, the RS 232 port is again checked for data in step 18J. As in the earlier instance, a receive data character is echoed back over the RS 232 port to the host computer in accordance with the known RS 232 format in step 18K.

In the preferred embodiment of the invention, video line inversion commences at either line 22 or line 23. The line counter of the software will, when line 21 has been counted, proceed in decision block 18L to the inverting sequence which will alternately apply inversion pulses to the Grass Valley unit depending upon whether line 22 or line 23 was selected as the beginning point for alternate line inversion. Each line following the selected beginning line will alternately produce a pulse from B1 of the microprocessor unit.

Decision block 18m will decide whether or not this broadcast is to be scrambled from detecting the state of B3, thus providing an ENABLE for beginning line inversion where appropriate. The scrambling indication received by a switch closure 18 of FIG. 1 will be detected and used to enable remaining encoding circuitry in a scrambled broadcast mode for applying the variously described scrambling modes to the video signal being transmitted in step 18M. Decision block 18N and delay 18O will, together, initiate inversion in step 18P, depending upon whether line 23 or line 22 was selected for inversion in accordance with a scrambling algorithm received by the encoder microprocessor.

Programming steps 18Q through 18U will process data received from the RS 232 port. This portion of the program begins with determining whether or not any data clear flags are set in step 18Q. In the event that a flag is set, all of the transmitted data which has been sent over the video signal is cleared from the microprocessor RAM buffer memory in step 18R.

Newly received data from the RS 232 communication link is processed in steps 18S, decision block 18T and step 18U. The received RS 232 data is decoded and the decoded data is checked for valid CHECKSUM and parity in decision block 18T and will output an indication indicating the data is valid or not. If an instruction to be executed is received from the host computer 11, it is decoded in programming step 18U. Additionally, the data to be transmitted in lines 10 through 16 is stored in the buffer memory in lengths of 5 bytes. Any header accompanying the data identifying the particular encoder to receive the data is removed prior to storing the data.

The remaining instructions are executed on a per field basis. These include decoding a countdown number associated with a new scrambling algorithm received from the host computer 11. Decision block 18w will determine when it is appropriate to change algorithm by decrementing after each field the countdown number received from the host computer. Decision block 18w will provide an indication that it is time to switch algorithms when the countdown number has been decremented to zero. At this time, instruction 18x will load the new algorithm number in place of the old agorithm number. With the new algorithm number, a LOAD ALL CALL mode instruction is loaded in the buffer memory along with parity and CHECKSUM data for transmission during line 10.

Decision block 18z and instruction 18x will determine whether, from the previous field, any parameters which require updating in the EEPROM have been changed. Thus, the EEPROM is kept current with information relating to the current algorithm number being utilized, the tier number and timer refresh data utilized to insure security against decoders which are rendered inoperable for periods of time which may have included data downgrading a particular encoder.

Instruction 18y will perform the calculation of the N1 numbers and reconfigure the scrambled algorithm in the 16 bins of the reordering matrix as previously described. By storing each of the reordered scrambling algorithms, and their corresponding N1 numbers, which are the summation of bits 0, 1, and 2, the encoder can insert, at a line identified by N1, the broad sync pulse to be included in the vertical interval. Additionally, the reordered scrambling algorithm will identify, by monitoring the bit number 3 of the reordered algorithm, the line on which inversion is to begin. Thus, all information relating to the beginning line of scrambling is available for the encoder as well as available for transmission to the subscriber decoders. Instruction 18z will continue monitoring the RS 232 port until 20 millisecond before the vertical interval begins, in which time control of the program returns to the instruction 18d.

Thus, by implementing the foregoing instructions, the RS 232 port is continuously monitored and new data is stripped of its header and stored in buffer memory. Data to be transmitted is output during lines 10–16, determined by counting the horizontal drive pulses corresponding to lines 10 through 16. Additionally, the scrambling sequence is determined from the received algorithm number and countdown number and decoding data is formatted and sent out on line 10 as an ALL CALL instruction.

DETAILED DESCRIPTION OF ENCODER

Figure 6A:
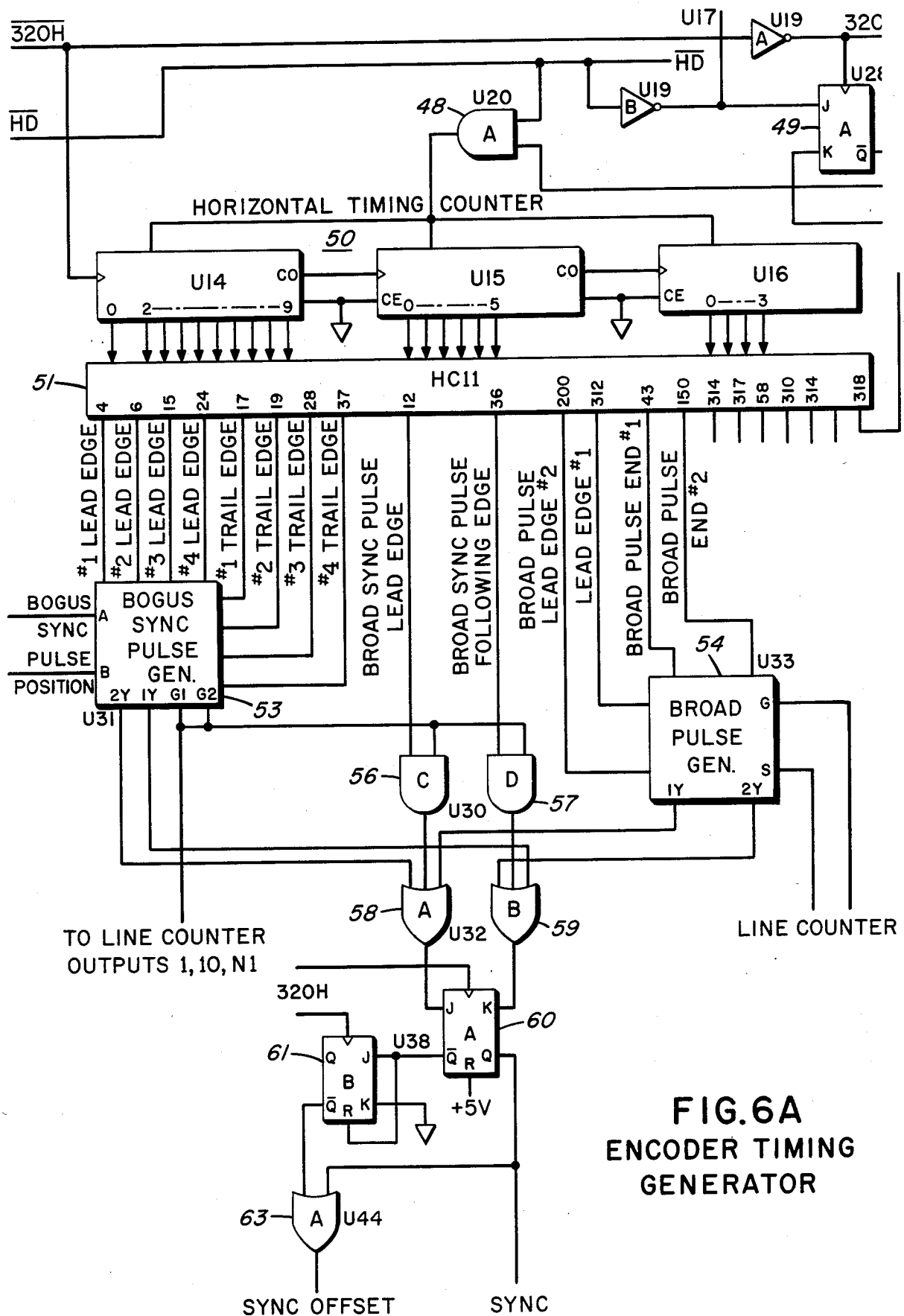
FIG. 6A demonstrates the encoder timing generator for creating the pulse events for the signals of FIGS. 2 and 3.

Referring specifically to FIG. 6A, that portion of the encoder which generates the video signal pulses of FIG. 2 is shown. FIG. 6A demonstrates an apparatus which is synchronized with the horizontal drive of the Grass Valley unit to provide a reset at the beginning of each horizontal drive interval. The horizontal drive interval denotes the beginning and ends of a line of the video signal.

The apparatus of FIG. 6A will generate all the pulse events for the video signal. As described in FIG. 2, these pulse events include (1) bogus sync pulses, (2) broad sync pulses, and (3) broad pulses, for stabilizing receiver AGC levels.

The horizontal timing counter 50 is provided which will count the clock pulses 320H provided by the Grass Valley Unit. The counter 50 divides the horizontal drive period up into 320 intervals. By appropriately decoding the output of the horizontal timing counter 50 with decoder 51, the beginning and end times for each of the pulse events to be inserted in the video signal are determined. The horizontal counter 50 is reset after each horizontal drive interval when the last decode, identified as 318, resets flip flop 47. At this time, AND gate 48 will effect the horizontal timing counter reset.

Decoder 51 includes a plurality of output decodes. These decode numbers, when multiplied by the period of the pulse 320H, provide the time of the respective decode with respect to the beginning of a horizontal drive interval. Thus, as shown in FIG. 6A, the beginning and trailing edges of each of the bogus sync pulses may be decoded, as well as the beginning and trailing edge of the broad sync pulses of 5.0 microsecond duration, as well as the leading and falling edge of the broad pulses utilized to stabilize receiver AGC voltage.

Decodes numbered 4, 6, 15, 24, 17, 19, 28, and 37 are combined in a mutiplexer 53. A bogus sequence sync pulse generator, to be described with respect to FIG. 6B, will select on inputs A and B of multiplexer 53 a leading edge and falling edge of a bogus sync pulse to be inserted during one field. The bogus sequence sync pulse generator will change the inputs to A and B of multiplexer 53 every field, thus changing the position of the bogus sync pulse of the field of the video signal.

An inhibit input from a line counter, to be described with respect to FIG. 6C, will inhibit for lines 1, 10, and N1 the generation of a bogus sync pulse. During these specified lines, AND gates 56 and 57 will be enabled while multiplexer 53 is inhibited, to provide the required broad sync pulses for insertion in the video signal.

The broad pulse generator similarly comprises a multiplexer 54. The broad pulses are inserted during lines 1, 2, 3, 7, 8, and 9 stabilizing the AGC voltage. These broad pulses are shown, more particularly, in FIG. 2. Decoder 51 will specify the leading and falling edges of each of the broad pulses, such that the output of multiplexer 54 will mark the beginning and end of this particular pulse event.

The leading and falling edges of the required pulses are combined in OR gates 58 and 59 and applied to the J and K inputs of flip flop 60. Flip flop 60 is clocked under the control of the 320H signal. The Q output of flip flop 60 thus marks the beginning and end of each pulse event for the video signal.

Flip flop 61 will provide a delay of approximately 1/320H after flip flop 60 generates a pulse. Thus, OR gate 63 will provide what is referred to as the SYNC OFFSET, having a duration slightly longer than the sync output duration. The Grass Valley process amplifier of FIG. 1 will utilize the SYNC OFFSET level to effect a pedestal suppression during the pedestal time, or horizontal blanking time, as well as a synchronization tip elongation for the requisite sync pulses. Thus, to obtain the elongated sync pulse of FIG. 3, wherein a difference of 140 IRE units is realized between the pedestal level of the video signal and the sync tip, the SYNC OFFSET will be utilized to provide pedestal suppression which effectively raises the pedestal level, as well as sync tip elongation, to achieve the desired 140 IRE unit difference.

Figure 6B:
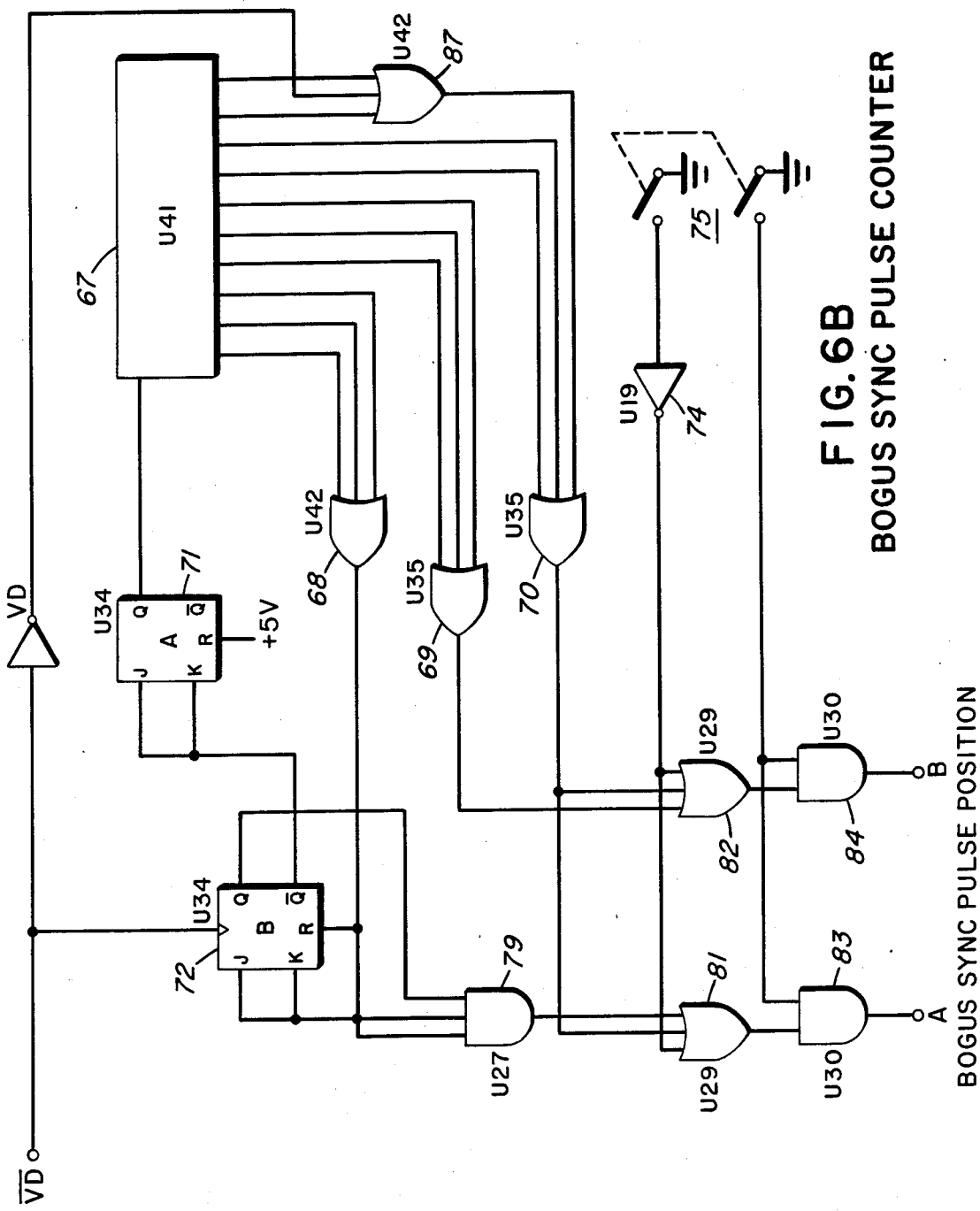
FIG. 6B is a schematic drawing of the bogus sync pulse counter for the encoder.

Referring now to FIG. 6B, the bogus sync pulse counter is shown, to generate for each field of the video signal a position for inserting bogus sync pulses. A counter 67 is set at the beginning of each field of the video signal by flip flop 71. Flip flop 71 is, in turn, toggled by flip flop 72 connected to the VD signal line from the Grass Valley process amplifier. As each field of the video signal is transmitted, the counter 67 will be incremented one count. Three consecutive counter outputs from counter 67 are applied to OR gate 68, the next three consecutive outputs to OR gate 69, and the third set through OR gate 70 and OR gate 87. A pair of switches 75, commonly controlled, will provide for a fixed position of the bogus sync pulse during maintenance operations and are not necessary to the invention. Gates 83 and 84 similarly cooperate with switches 75 to provide for a fixed position bogus sync pulse during subsequent fields of the video signal during these maintenance operations.

The outputs of OR gates 81 and 82 will specify a two bit binary code which changes every three fields. As such, the binary code will specify a leading and trailing edge for multiplexer 53 to be combined to form a bogus sync pulse for each field of the video signal.

Referring now to FIG. 6C, a vertical line counter is shown which will count each video signal line of each field. By counting lines, it is possible to determine lines 1, 10, and N1, necessary to insert broad sync pulses, as well as those lines necessary to insert the broad AGC stabilization pulses. Line counter 90 is toggled every horizontal drive interval to count lines of each video field. A programmable decoder 100 receives the N1 number from the microprocessor latch 33 of FIG. 4, and upon decoding the line at which N1 is to appear, will provide an enable output which is received by OR gate 96. Gates 93 and 92 similarly decode lines 10 and 1 of the vertical field, such that the broad sync pulses for these lines may be inserted by the multiplexer 53 of FIG. 6A. Broad pulse generation is accomplished by OR gates 94, 95 and 97, AND gate 98 and inverter amplifier 99, such that those lines wherein broad pulses are to appear are identified for the multiplexer 54 of FIG. 6A.

The vertical line counter 90 will be reset after counting each field of the video signal. A flip flop 106 and switch 110 are utilized to provide for a different count, corresponding to different video standards such as PAL or NTSC. These different video standards utilize a different number of lines in each field and, therefore, the reset of vertical line counter 90 may be controlled depending on which system the encoder is operating. An indication from the microprocessor output latch 33 indicating whether NTSC or a PAL system is selected will enable gate 104 depending on which of the systems is being received.

Other functions controlled by the vertical line counter include a tooth blanking to the Grass Valley process amplifier. This blanking is effected during the vertical interval, where data is to be sent on lines 10–16. Additionally, a reset for the counter is effected by a decode from AND gate 91. This reset and tooth blanking will be more particularly explained with respect to the remaining portion of the encoder shown in FIG. 6D.

Figure 6D:
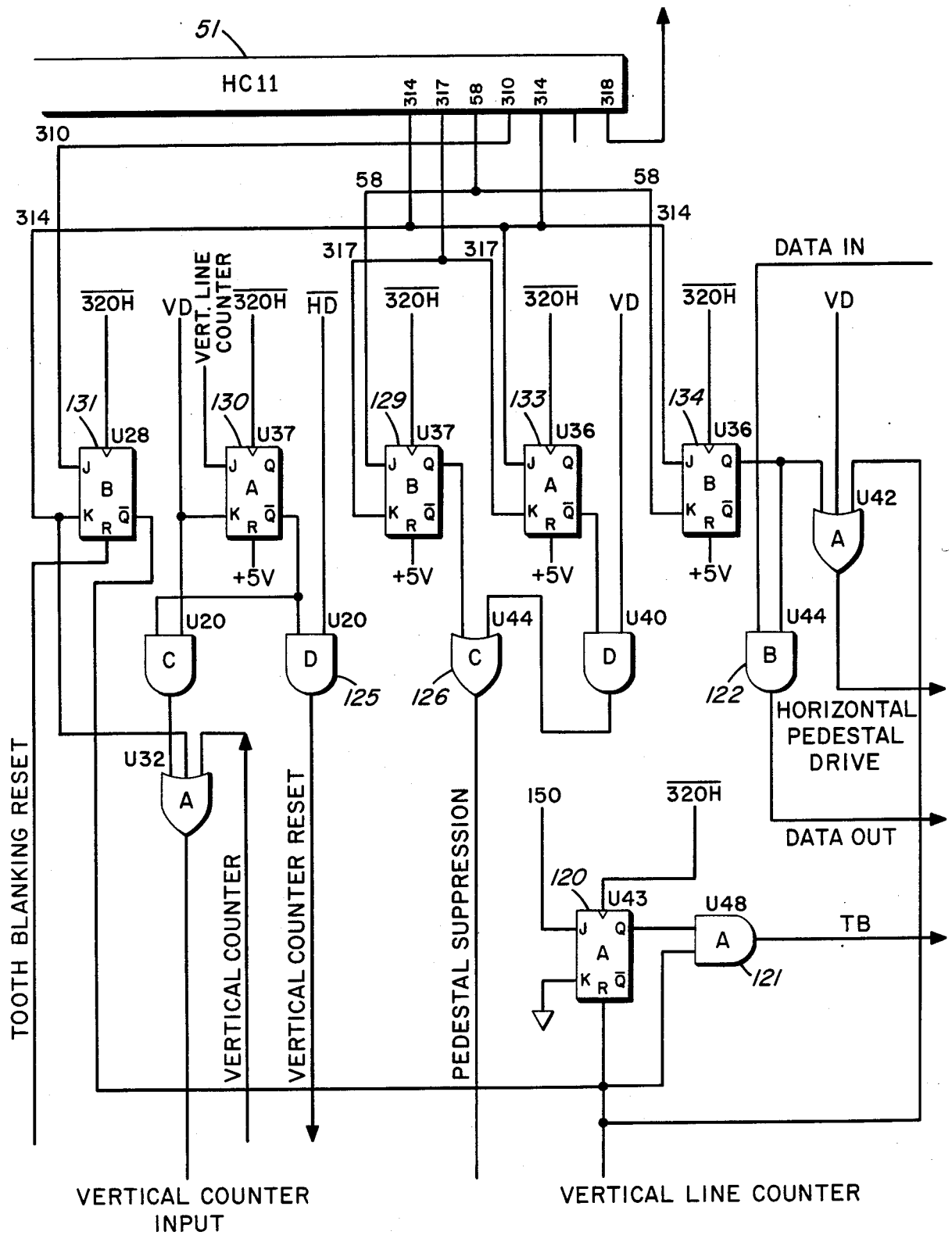
FIG. 6D demonstrates the interface circuitry between the vertical line counter and horizontal timing generator of FIGS. 6A and 6C.

Referring to FIG. 6D, there is shown a JK flip flop 120 which receives a decode output 150 from decoder 51. The JK flip flop 120 is clocked by the 320H clock signal. The AND gate 121 will provide a tooth blanking output to blank the Grass Valley process amplifier of FIG. 1 during certain lines identified by the vertical counter. Additionally, the AND gate 121 is under control of JK flip flop 131. Thus, for that portion of the horizontal drive interval between decodes 150 and 310 of the horizontal drive interval, tooth blanking will be effected for those lines in which data is to be inserted and which are normally blanked. A data gate 122 will receive serialized data from the microprocessor of FIG. 4 and under control of flip flop 34, gate the received data to the Grass Valley process amplifier during the active portion of the line.

The pedestal suppression is effective in order to move the pedestal upwards, 100 IRE units, by flip flops 133 and 129. Pedestal suppression is effected to provide for the apparent extension of the sync tips as shown in FIG. 3 with respect to the pedestal level. The pedestal suppression output is applied to the Grass Valley unit during that portion of the line representing the pedestal.

The reset to the vertical counter is generated by flip flop 130 and AND gate 125. After the requisite number of lines of a field have been counted, the counter is reset to begin counting the next field. Flip flop 130 participates determining whether or not an even or odd field has been counted, such that the vertical line counter will be reset depending upon whether an odd or even field is being processed at the appropriate time.

Thus, it is seen that the apparatus described in FIGS. 6A through 6D will generate each of the pulse events required for insertion in the video signal. Additionally, this circuit will control pedestal suppression and sync offset such that the extent of synchronization tip to pedestal levels are expanded as shown in FIG. 3. Tooth blanking is effected during those lines of the video signal where blanking is required, such that data or other pulse events may be included without a DC bias associated with the signal.

Subscriber-Receiver Decoder

The scrambled video signal of FIGS. 2 and 3 is modulated on a suitable carrier and transmitted to the various subscribers of the cable system. The signal of FIG. 2 includes a vertical interval, altered by deleting normal equalization and serration pulses and inserting false synchronization pulses. Additionally, the remaining portion of the video signal of FIG. 3 includes alternate inverted picture details, as well as a DC level which renders a normal television receiver biased in the black level, making viewing of any picture detail impossible. Additionally, even if the DC bias of FIG. 3 is removed, the video compression will not provide the range of gray scale for viewing a normal TV picture.

Figure 7:
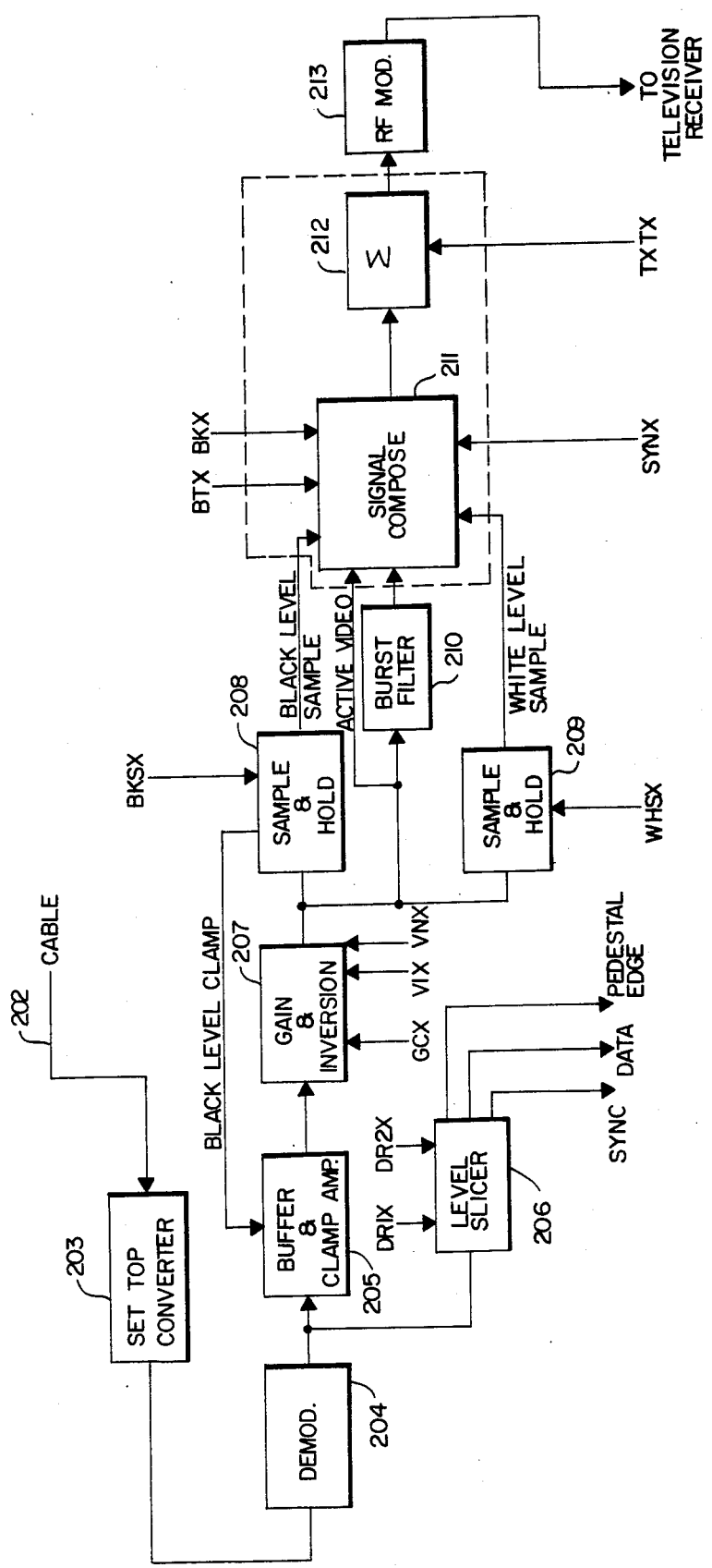
FIG. 7 is a block diagram of a video processing circuit for a receiving decoder.

Descrambling of the signal of FIGS. 2 and 3 is accomplished with apparatus shown in FIG. 7. FIG. 7 illustrates a block diagram of circuitry for processing the scrambled video signal such that a viewable, normal television signal is produced for modulation by an RF modulator 213 at a standard frequency for television viewing. A standard set top converter 203 will remove the cable carrier, and apply the resulting signal to a demodulator 204. In non-cable systems, of course, another suitable type of converter is utilized to remove the respective carrier. The demodulated base band signal is applied to a buffer and clamping amplifier 205 and level slicer 206. The circuitry following the buffer and clamping amplifier 205 will discard all of the pulse events occurring in the vertical interval, as well as the remaining portion of the video field of a received signal. Thus, only the burst signal transmitted with the video, and the active portion of the video field following line 22 is permitted to pass through the circuitry following the buffer and clamp amplifier 205 in a manner to be explained.

In order to reconstitute a normal television signal, three levels are detected on the scrambled video signal. The first level produced by a level slicer 206 are sync pulses produced by the video signal. These sync pulses will be pulse-width detected in circuitry to be described such that the special broad sync pulses of FIG. 2, marking lines 1 and 10 will be detected. As such, the vertical interval for each field of the video signal may be located.

Additionally, the level slicer 206 will provide data transitions such that the scrambling algorithm and any text information transmitted by the head end system will be available for decoding, execution or display.

Additionally, level slicer 206 will provide a signal transition to identify the pedestal edge of the video signal. Locating the beginning of each pedestal or horizontal blanking interval, sync pulses may be inserted in a reconstituted video signal at the appropriate location. All pulse events to be inserted in the video signal can be accurately located with respect to the detected pedestal edge.

Having thus located the pedestal edge for each line of video signal transmitted by the head end system, and the beginning of each vertical field, the subscribers decoder will be able to generate the following gate signals:

SYNX: The position of a sync pulse;
WHSX: The position of a white sample on line 20;
BKSX: The time of occurrance of a black level sample on line 20, and;
BTX: The time of occurrence of burst for each video line.

The decoder circuitry to be described can also detect from the data output of level slicer 206 the scrambling algorithm being transmitted, and from the sync output determine the position of the third broad sync pulse, N1, thus identifying the descrambling sequence for that video field.

From these detected quantities, the following timing gate signals can be determined:

V1X: Video Invert, and VNX: Video Non-invert.

Other gate signals shown in FIG. 7 include TXTE, which is a text switch enable permitting text to be combined with the video signal for viewing, and a BKX signal, which is a black level switching time, for blanking a portion, usually the bottom, of a subscriber's television picture tube during text transmission.

Having thus generally described the type of gate signals which are generated by the decoding apparatus at each subscribers location, reconstitution of the video signal can proceed as follows.

The video signal supplied by buffer and clamping amplifier 205 is amplified in 207. If a line of video signal is being received which is to be inverted, as determined by gate signals VIX and VNX, the gain and inversion amplifier 207 will perform the inversion at the gate time specified. Additionally, the amplitude of the signal will be normalized by a signal GCX, indicating that the gain compression effected on the video signal at the head end is to be removed by increasing the gain of the gain and inversion amplifier 207.

As was indicated with respect to FIG. 2, during line 20 of the video signal, the head end will transmit a white sample level and black sample level. The WHSX gate signal will sample and hold the video signal at this time, using sample and hold circuit 209 as well as the black signal level, BKSX, using sample and hold circuit 208 at its appropriate time. Thus, the apparatus of FIG. 7 will accurately note a representative white sample and black sample level on which to set the pedestal level, and otherwise establish a sync tip level. The black level sample taken by sample and hold 208 during the respective portion of line 20 of the video signal, establishes a clamping level on buffer and clamp amplifier 205. The clamping level will hold the pedestal at the black level, thus removing the pedestal suppression imparted by a Grass Valley process amplifier at the head end.

The black level sample and white level sample are used to drive a signal difference, and this signal difference constitutes a known video IRE level. From the known video IRE level composed from the samples, a sync tip level is generated by the signal compose network 211. Thus, every time a gate signal SYNX is applied, a known sync tip level can be generated for adding to the reconstituted video signal. Additionally, a gate associated with the signal compose network 211 will permit the burst signal to exit the signal compose unit 211 at the appropriate time.

Thus, it is seen that the signal compose circuit 211 will be under control by accurate gate times with respect to certain known events of the video signal, permitting reconstitution of the video signal to a normal NTSC or PAL format. The SYNX gates, besides indicating horizontal synchronization pulses, can of course indicate the presence of equalization pulses, serration pulses, and any other pulse even for the video signal.

The resulting video signal is summed with a text signal, locally generated by the decoder from decoding data sent by the head end system. The signal from combining network 212 is applied to an RF modulator circuit 213 for modulating a circuit within the pass band of the consumer's receiver for display.

Thus, it is shown from FIG. 7 that by determining the sync pulse transmissions of the received video signal, the data included on the video signal, and the beginning of each pedestal edge for the video signal, a reconstituted signal may be formulated from the timing signals derived from this information.

The timing information for generating all of the aforesaid gate signals is produced from a decoder circuit shown in FIGS. 8A and 8B.

FIGS. 8A and 8B demonstrate the remaining components of the scrambling decoder. A standard cell gate signal generator 301 will provide all of the decodes for the circuitry of FIG. 7, from which the video signal is reconstituted.

The standard cell 301 will generate these decodes based on a system clock 305, which operates at a frequency of 7.15909 megahertz for the NTSC system and 7.11100 megahertz for the PAL system. The pedestal edge, a sync output, and data output from the circuitry of FIG. 7 is received in the standard cell from the level slicer 206 and the aforesaid decodes are generated in response thereto.

The standard cell is additionally controlled by a microprocessor 302. The microprocessor 302 is a TMS70C40 eight bit microcomputer. An eight bit bus connects the microprocessor 302 and standard cell 301, and is also connected to a EEPROM 304. Additionally, a RAM 303 operates as a text generating chip receiving data to be displayed on the subscriber's television receiver and converting that data into alpha numeric characters for display.

The EEPROM 304 is initially programmed by raising input A5 of microprocessor 302 to receive a subscriber's identification code. Once the identification code is inserted, the head end system may address the subscriber and load any tier data which permits reception of any one of a plurality of programming tiers. Additionally, the EEPROM 304 will store the algorithm which is contained in a current broadcast All Call Mode Command.

The standard cell 301, which will be described in considerable detail with respect to the remaining Figures of the case, includes a serial clock output, RAS output, CAS output, TRQE output, all associated with generating from the text RAM 303, data to be displayed on the television receiver.

Additionally, the standard cell 301 will output serial data removed from lines 10–17 of the video signal under control of the microprocessor 302. The system clock 305 signal is also applied to the microprocessor 302 from the standard cell 301. The read/write control from the microprocessor 302 will control the data transfer from the standard cell and the microprocessor 302. Additional to reading out received data transmitted with a video signal, the microprocessor 302 will load various strobes into the standard cell for generating the aforementioned gate signals which reconstitute the video signal in cooperation with FIG. 7.

An L10/N1 output of the standard cell 301 provides an indication of the presence of a wide sync pulse, which would normally appear on lines 1, 10, and N1 of the video signal. The L10/N1 output will provide an indication of the presence of these pulses, thus permitting the system to detect the vertical interval of each video signal received, as well as decode position of the third wide sync pulse, corresponding to the number N1 which corresponds to the scrambling algorithm decoding bin.

The remaining signals supplied by the standard cell 301 will be further described when the specific circuitry of the standard cell 301 is explained.

The microprocessor 302 also includes several dedicated outputs. The AUX 1, 2 and 3 outputs will provide enables for controlling peripheral equipment in the subscriber's home. When addressed by a proper command from the head end system, any one or all of these three enable outputs will be raised by the microprocessor 302, permitting control from the head end of these outputs.

A so-called Tamper function is provided by terminal A0 of the microprocessor 302. The Tamper function is connected to a switch, operated in response to the opening of the package containing the decoder. With the Tamper pin A0, in the event a decoder is attempted to be opened or tampered with, the microprocessor 302 will sense the disappearance of voltage on A0 and write into the EEPROM a code which will inhibit any further decoding by the system.

Additionally, a message display function is provided on pin A4 of microprocessor 302. When the message display function is raised high, through a switch or other signal generating device located at the subscriber's location, preferably on the set top converter, any messages which have been decoded and stored in the message RAM 303 will be displayed on the television receiver.

A switch for indicating whether the system is an NTSC or PAL system is also provided.

To load the EEPROM with the subscriber identification number, pin A5 of the microprocessor 302 is raised high, such that a subscriber number may be loaded in through the terminal A5.

Figure 9A:
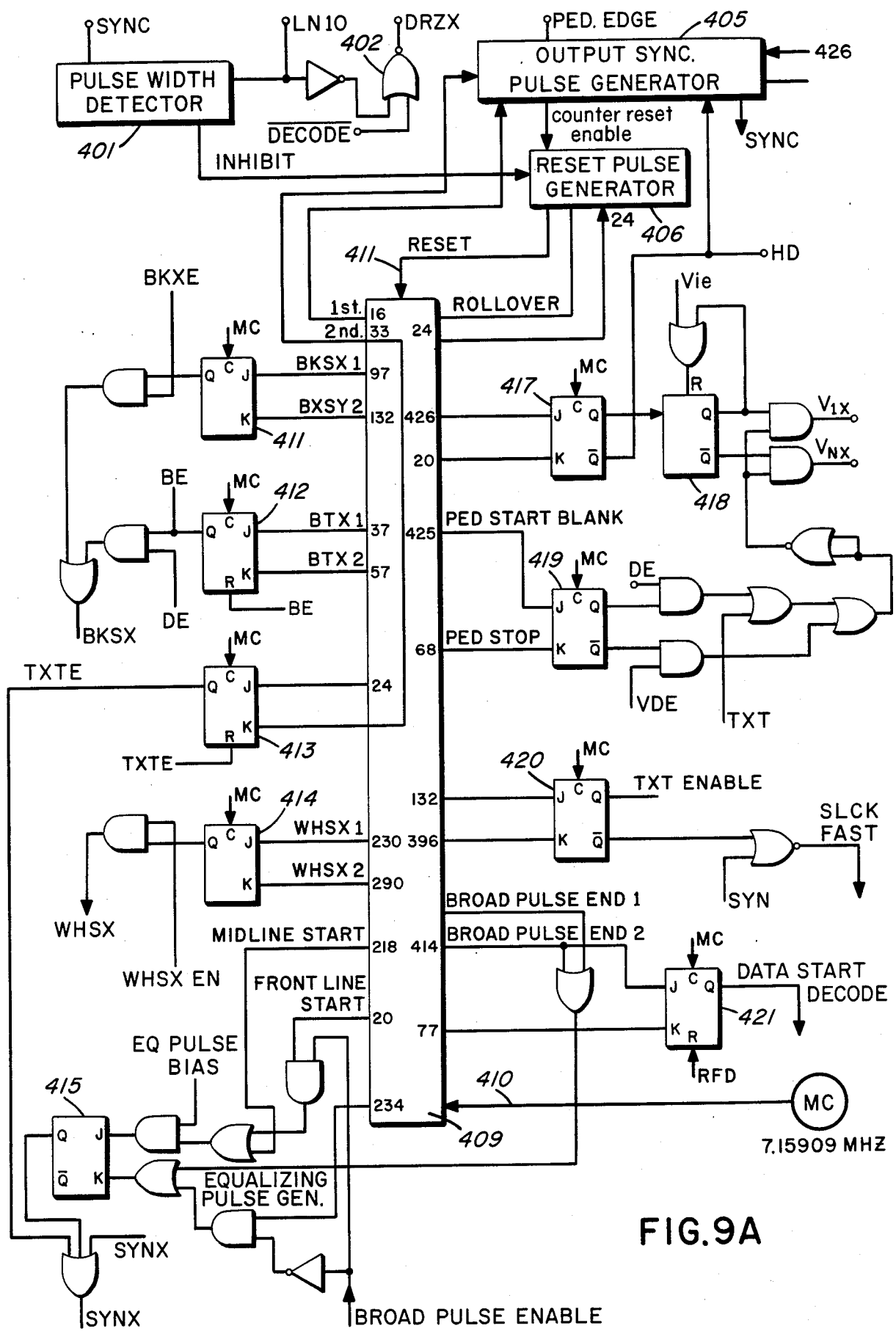
FIG. 9A is a horizontal timing generator included in the standard cell of the receiver decoder.
Figure 9B:
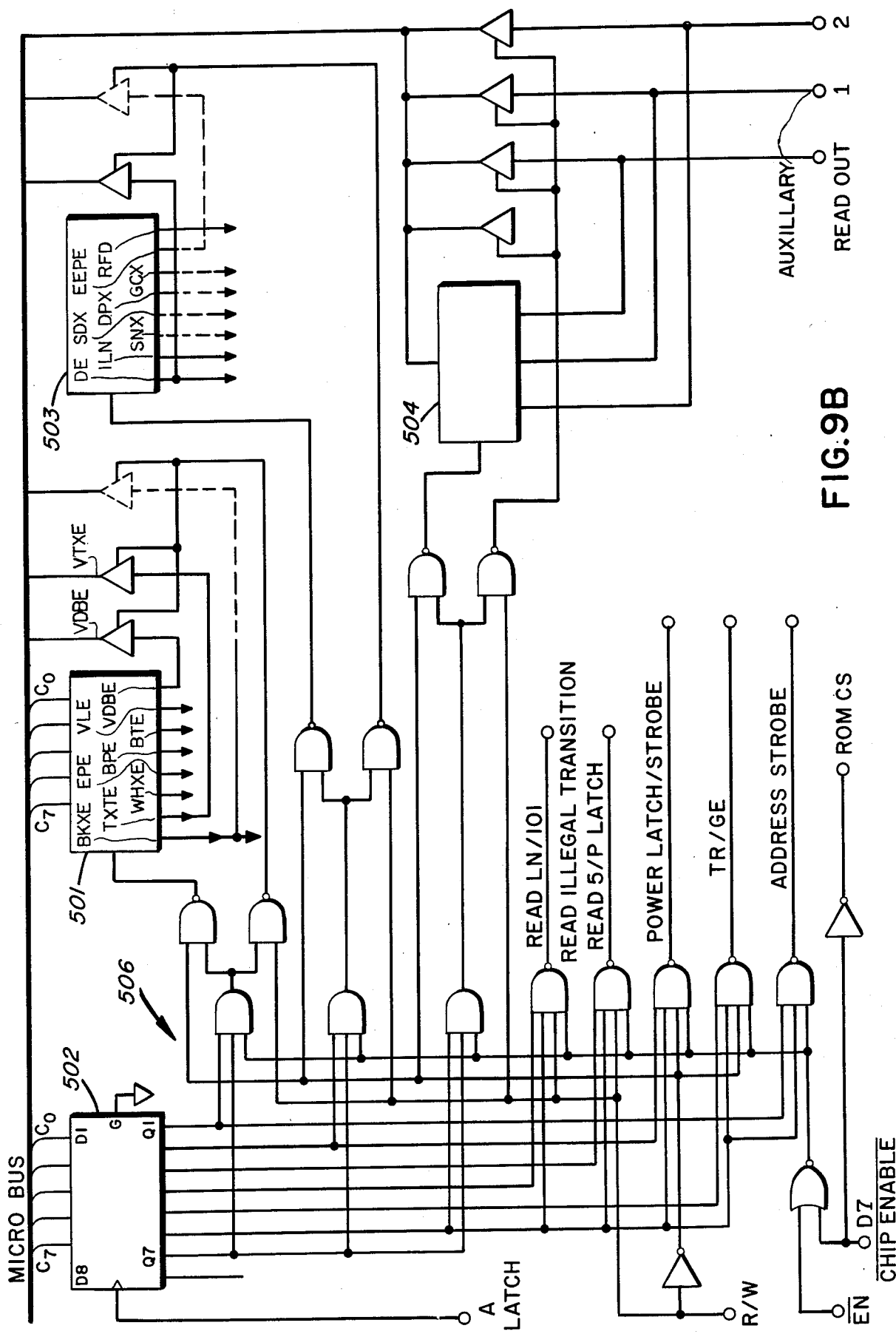
FIG. 9B is a microprocessor interface for the standard cell to communicate with the microprocessor of FIG. 9A.
Figure 9C:
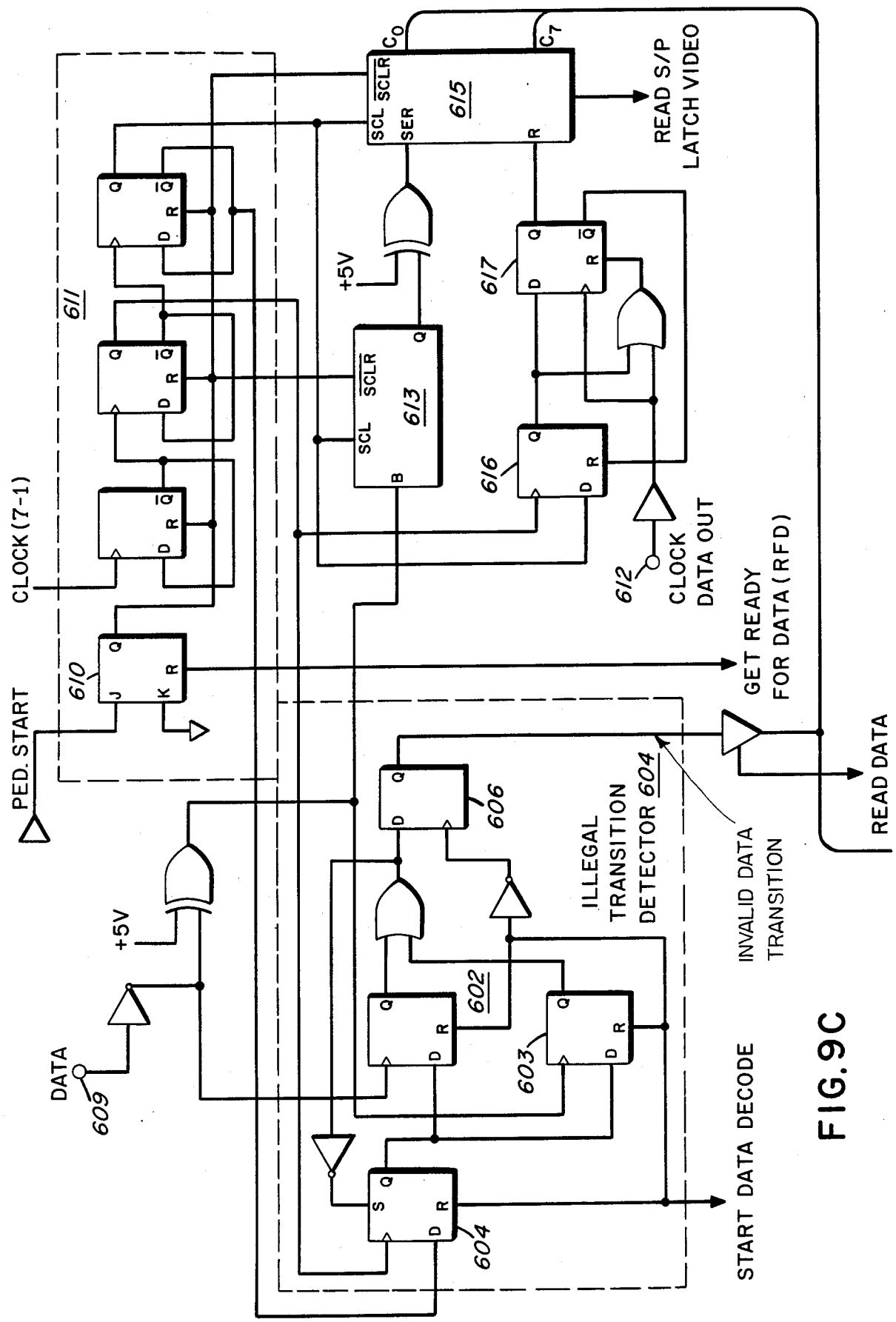
FIG. 9C is a data interface circuit of the standard cell for receiving and latching data from the video signal and transferring the data to the microprocessor.

Referring to FIGS. 9A, 9B, and 9C, the internal configuration of the standard cell 301 (FIG. 8A) is shown in detail. In FIG. 9A, the various decodes necessary to reconstitute the standard video signal are shown. These decodes are accurately synchronized to the pedestal edge detected from the video signal. All of the generated gate signals are further enabled from commands by the microprocessor 302 and latched in certain strobe registers of FIG. 9B. Thus, when a strobe command is present in the registers 501 and 503 of FIG. 9B, those signals which are generated in FIG. 9A, in precise alignment with the pedestal edge, are gated through to the circuitry of FIG. 7 for reconstituting the signal.

Referring now to FIG. 9A in particular, a pulse width discriminator 401 is shown which receives the synchronization data from the level slicer of FIG. 7. Synchronization data is compared with an accurately controlled window of 4.5 microseconds in order to determine the presence or absence of a broad synchronization pulse. The presence of such a pulse would provide an output logic state of 1 to the LN10 terminal, thus indicating the receipt of either line 1, 10, or N1.

Pedestal edge information is received in an output pulse sync generator 405. The output pulse sync generator 405 will align the pedestal edge with the gate signals to be produced for reconstituting the video signal. The output sync pulse generator 405 will synchronize a counter 409, such that each of the decode outputs shown will occur in synchronism with the detected pedestal edge.

The 7.15909 system clock pulses are counted in a counter 409, having associated decodes as shown. The decode number shown represents the count number at which a decode output is produced. Thus, by multiplying the decode number by the reciprocal of the clock frequency, the time interval between the pedestal edge and the decoder are determined. The outputs of the counter 409 are connected to a plurality of flip flops 411 through 421. At the beginning of each pedestal edge detected by the output sync pulse generator 405, the counter 409 is reset by a reset pulse generator 406. Thus, the decode outputs of the counter 409 are held in synchronism with the pedestal edge. Thus, all of the appropriate decodes necessary to generate the gate signals applied to circuitry of FIG. 7 are provided at the output of counter 409.

These outputs are strobed from corresponding strobes received from the microprocessor 302. The required strobes are loaded into the register 501, 502 and 503 of the microprocessor register of FIG. 9B. Thus, when each of these enables are applied to the appropriate flip flop 411 through 421, the accurately controlled timing signals of the counter 409 are gated through each flip flop. Each flip flop is also connected to receive as a toggling signal, a clock pulse signal from the master clock.

Thus, it is seen that by sensing the pedestal edge of each line of video signal information, all of the appropriate decode times may be generated and synchronized therewith for reconstituting the video signal.

Additional to those gate signals noted for controlling the circuitry of FIG. 7, the horizontal drive pulse is generated from flip flop 417, for use in timing the microprocessor 302. Thus, with the horizontal drive pulse as detected and the vertical interval as detected, the microprocessor 302 keeps track of each line of the field received, such that it can provide the enables to the registers 501, 502 and 503 of the FIG. 9B.

Referring now to FIG. 9B, the interface of the standard cell 301 which communicates with the eight bit bus of the microprocessor 302, is shown in detail. An address register 502 will receive the address of data which is to be loaded into one of registers 501, 503, or 504. The address register 502 is connected to an address decoder 506. Address decoder 506 will enable one of the aforesaid registers to receive data subsequently sent over the eight bit bus.

Upon a WRITE enable, the registers 501, 503 and 504 will be gated to receive the necessary strobes for enabling the circuitry of FIG. 9A. Additionally, register 503 will provide an output on the GCX strobe line, directly conveyed to the circuitry of FIG. 7 to control the gain of amplifier 207 such that the compression originated at the head end to the signal is removed. Additionally, the register 503 will provide a request for data signal RFD, to permit data received by the standard cell to be gated out over the microbus for reading by the microprocessor. Thus, the structure of FIG. 9B will fully enable communication between the standard cell and the microprocessor such that appropriate strobes are available to generate the gate signals of FIG. 7.

The remaining portion of the standard cell 301 shown in FIG. 9C receives the data from the level slicer of FIG. 7, and loads the data into a parallel register for reading by the microprocessor. This data is received over lines 10 through 17 of the video signal.

At the beginning of an interval of time in which lines 10 through 17 are received, the microprocessor will load enable commands into register 503 of FIG. 9B. A ready for data (RFD) strobe will be applied to flip flop 610, resetting the flip flop, as well as to the flip flop 421 of FIG. 9A. Thus, these two flip flops are ready to begin a sequence for receiving data on lines 10 through 16.

Data enters from the level slicer of FIG. 7, port 609, and is supplied to both an illegal transition detector 604 and to a serial register 613. Serial register 613 is a delay register, which will receive eight bytes of data per line and underclocking of data clock 611, transfer the received clock data to a serial input of register 615. Register 615 is a serial to parallel converter for receiving the serialized data and providing on outputs C0 through C7 a parallel format of this data. Two clock inputs of this serial to parallel latch, SCL and SCLR, control the clocking of the received data. To remove the data from the serial to parallel latch, the microprocessor provides a clocking input on port 612. Flip flops 616 and 617 will be reset by the clock data received on port 612 and set by the clock generator 611. Thus, the contents of the serial to parallel latch 615 are outputted on lines C0 through C7 at the appropriate time.

The illegal transition detector 604 comprises a first flip flop 604 and second flip flop 603 which are reset by a start data decode signal from FIG. 9A. The start data command, generated from flip flop 421 of FIG. 9A indicates the beginning and end of the data period of the video signal corresponding to lines 10 through 16. The illegal transition detector 604 provides a 90° shift of the clock signal generated by clock generator 611 and compares this shifted 90° signal with each data transition detected on port 609. In the event that an illegal transition occurs during the period in which a data bit is received, flip flop 606 will be set and the invalid data transmission indication is available for transmission to the microprocessor. At the time the microprocessor calls for data to be read from serial to parallel latch 615, the invalid data transmission data will also be fetched by a decode from the address register 506 of FIG. 9B.

Thus, the microcomputer 302 of FIG. 8A will be able to retrieve any received data on lines 10 through 16, along with an indication of whether an invalid data transmission occurred upon reception of that data. Reliability of the data so retrieved is assessed by the microcomputer in programming steps to be described. At the beginning of each line of data, flip flop 610 will reset the clock and begin clocking again at a time accurately synchronized with the pedestal edge of each received line.

Thus, as seen from FIGS. 9A, 9B, and 9C, the complete interface between the video processing circuitry and the microprocessor is described. Other functions performed by the standard cell include decoding other commands received from the microprocessor such as to display text data or to provide a power latch, power fail sensing function, and power latch reset function to the microprocessor. These details are not essential to the invention and will not be further described.

The foregoing description of the system for generating decodes reconstituting the video signal depends on circuitry as shown in FIG. 9A which maintains the output pulse sync generator in synchronism with the incoming video signal wave form. By resetting the counter 409 each time the reset edge is detected, accurate timing signals for reconstituting the video signal may be generated.

Counter 409 of FIG. 9A is also shown in FIG. 10A with those decodes appropriate to the discussion of the horizontal synchronization pulse generator 405. Counter 409 counts the system clock pulses and provides for accurate gate signals synchronized with the leading edge of the received video signal pedestal marking the horizontal blanking interval. Each new leading pedestal edge will provide an accurate reset to counter 409.

Figure 10B:
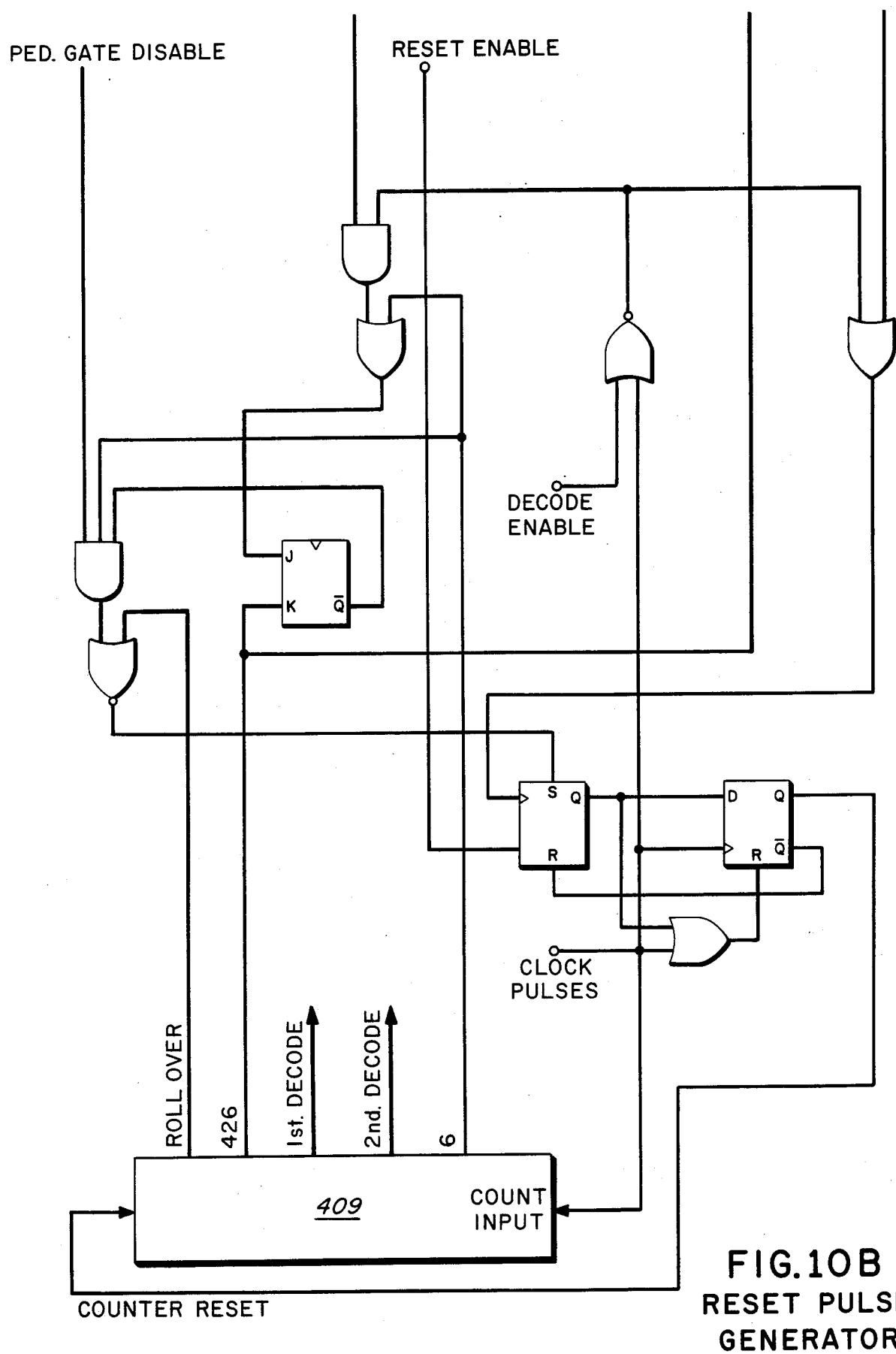
FIG. 10B is a reset generator for the horizontal timing counter of FIG. 9A.

The reset generator 406 of FIG. 9A is shown in detail in FIG. 10B. The reset generator 406 will generate resets on the following conditions:
(1) the rollover of the counter;
(2) the first pedestal edge detection;
(3) the first decode 16 which occurs 16 counts after the first leading edge has been detected.

The output pulse signal generator 405, also shown in greater detail in FIG. 10A, receives an enable pulse from the pulse width discriminator of FIG. 9A. This enable signal occurs approximately 6 microseconds before the pedestal edge and ends 14 microseconds after a sync pulse leading edge detection is detected by the pulse width discriminator. As such, any transition appearing at the pedestal edge input 700 during this time will be processed.

Other signals received by the reset pulse generator 406 include a decode enable (DE) which is a strobe received from FIG. 9C indicating a scrambled broadcast is to be descrambled. The pedestal gate disable is applied from the sync pulse generator to prevent a reset when the leading edge of a received pedestal edge is being propagated through the pulse generator 405.

Pedestal transitions from the level slicer of FIG. 7 indicate the beginning of horizontal blanking time. These pedestal edges are received on port 700, and applied via an inverter to the input of flip flop 701. The negative going transition of the pedestal edge is clocked almost immediately through flip flop 702 and 703 subject to the delays inherent in these flip flops. The clocking of the edge is controlled by AND gate 711. AND gate 711 receives an enable signal from the pulse width discriminator circuit of FIG. 9A. This signal is a timing level which occurs 140 nanoseconds after a sync pulse detection of the pulse width discriminator. Additionally, the horizontal drive HD signal generated by FIG. 9A and a pedestal gate disable signal from flip flop 702 control the propagation of the pedestal edge through flip flop 701, 702, and 703. It should be noted at this point that the counter of FIG. 9C rolls over without a pedestal edge detection when the last of its decodes go high.

The result of propagating the pedestal edge through flip flop 701, 702, and 703 is to initiate on flip flop 709 an inhibit signal to delay line 710. Delay line 710 is a digital clocked delay line which will hold the pedestal edge until flip flop 709 is reset.

The setting of flip flop 709 initiates the second counter reset to the counter 409 of FIG. 9A, thus resetting all horizontal timing. After the first pedestal edge resets the horizontal timing counter 409, the first decode, shown in FIG. 9A will apply the pulse necessary to reset flip flop 709. At this time, the edge in the delay line 710 is propagated through, and forms the first edge of the sync pulse associated with that line of the video signal which begins with the detected pedestal edge. Additionally, the propagated edge will effect a set on flip flop 709 as well as a reset to flip flop 703.

The horizontal timing counter 409 will, having been reset by the first decode applied to gate 712, continue to count, and this time count past the first decode to the second decode which identifies the end of the horizontal synchronization pulse. The second decode will cause a reset of flip flop 709, previously set when the first of the pedestal edges propagated through the delay line to mark the beginning of the horizontal synchronization pulse. Thus, the width of the pulse is accurately controlled as the time between first and second decodes, and the pulse is synchronized with the pedestal edge.

Each line of the video signal received by the standard cell results in a reset of the horizontal timing counter when: (1) the timing counter rolls over, and (2) receives a first pedestal edge after the roll-over occurs, and (3)

after the first decode of 11 goes high. The second decode will define the trailing edge of the horizontal synchronization pulse. The counter will count again to the roll-over count, wherein the last digit of the counter decoder will start the next reset for the next line.

The remaining two components of the system decoder which need to be illustrated in greater detail are shown in FIGS. 11 and 12. FIG. 11 illustrates in detail the level slicer of FIG. 7. The level slicer of FIG. 7 generates those transition signals corresponding to the received synchronization signals, data signals and pedestal edge signals to which the system timing of FIG. 9A aligns its generated gate signals. The sync output of the level slicer is utilized to detect the broad sync pulses which appear at lines 1, 10 and N1 of a scrambled broadcast. Thus, by detecting the presence of these signals, the vertical interval may be identified as well as the required N1 number for descrambling.

Data transmitted by the encoder in lines 10 through 16 will be seen as transitions at the output of comparator 906.

The pedestal edge, marking the beginning of the horizontal blanking period, is detected with comparator 902. Comparators 902, 906 and 905 receive the input video signal to derive these signal transitions.

The level slicer includes two controls DRIX 1 and DRIX 2. DRIX 1 is open during the reception of an encoded video signal, and DRIX 2 is closed during normal video. These signals are gate signals generated by the circuitry of FIG. 9A.

The video signal, when scrambled, will have the DC offset associated with it which will change the reference voltage from a normal video signal appearing on the comparator inputs 902, 906 and 905. As such, it is necessary to scale the comparator reference voltage depending on whether the received signal includes the offset, biasing the active portion of the video below black level, or in the case of normal video, wherein the DC bias signal is removed.

Additionally, a normal video text scaling amplifier 903 is provided which will scale the video signal used to write text messages on the television receiver. DRIX analog gates 910 and 911 will alter the gain of amplifier 903 to provide a signal level which will be utilized during an unscrambled video reception having text data to be displayed.

To generate the reference voltages for each of the comparators 902, 906 and 905, a white level peak detector 901, having a peak charged capacitor 901a, provides the reference for comparator 902. Thus, during a scrambled broadcast, wherein the active video is offset below the pedestal level, comparator 902 will provide an output on the beginning pedestal edge of the horizontal blanking period.

Resistors 918, 916 and 915 sum the peak negative video signal, detected by negative clamp buffer 907. The negative clamp buffer 907 receives a negative charge proportional to the peak negative signal transition of the video signal. Resistors 915, 916 and 918 are selected such as to provide a threshold comparison level which will detect on those portions of the waveform of FIG. 3 comprising a completely scrambled signal representing the sync tip level and the midpoint of the data excursions shown in FIG. 2.

Referring now to FIG. 12, the signal composer is shown in greater detail. The signal composer of FIG. 12 will insert pulses in the video signal necessary for constituting a normal video signal by closing the SYNX switch 928 at the beginning and end of each pulse event. The control of SYNX 928 is effected by gate signals from FIG. 9A.

The sync tip level necessary to generate a synchronization pulse of the proper amplitude is determined by scaling the black sample level and white sample level difference during an encoded video signal broadcast. The black sample level is derived during that portion of line 20, shown in FIG. 2, containing an accurate black level sample. The white level sample, also determined by sampling line 20, is subtracted in differential amplifier 919 from the black level sample to provide a difference which equals a reference IRE level of 40 IRE units. This difference in IRE levels, determined by sampling line 20, is used to provide an accurate sync tip level with respect to white levels. During an encoded broadcast, switch DX 922 is closed, such that the scaled reference levels are applied during closure of SYNX 928 as a reference voltage to amplifier 926. On the closure of BKX switch 930, the burst signal is conveyed through amplifier 926 to the output video buffer amplifier 932.

During text generation, a closure of the TXTX switch 924 will generate a writing luminance signal level for writing text data in accordance with the closure of 924 on a TV screen. The BKX 930 switch is closed under control of the gate signal generating circuitry of FIG. 9A to blacken that portion of the screen on which the text is to be written. Amplifier 926 references the black level applied to its inverting input, with the text luminance generated in response to closure of TXTX switch 924, and the first signal to form a text luminance properly referenced to black level, and a burst signal properly referenced to black level.

Thus, each of the circuits of the standard cell of FIG. 8A have been described in detail with respect to their cooperation with the video processing circuitry of FIG. 7 and that of the microprocessor of FIG. 8A.

Having thus described all the hardware features of the circuitry, a detailed description of the software is now provided for the decoder. Each of the functions which has been previously described as being carried out by the decoder is timed in accordance with the programming of FIG. 13. FIG. 13 is an overview of the instruction execution sequence of the microprocessor of FIG. 8A.

Referring now to FIG. 13, the beginning of the flow chart indicates a reset common to all program devices for starting clocks, resetting flags and otherwise preparing the microprocessor to execute the following program steps.

The first routine, 952, executed by the microprocessor, is to locate the beginning of each field of video signal. The microprocessor will sample the LN10 output of FIG. 9A, such as to detect the presence of a broad sync pulse of the requisite 5.0 microseconds. As was noted in the discussion with respect to the encoded video signal, line 1 always begins with a broad sync pulse in both the scrambled and unscrambled mode of transmitting signals from the encoder. In the scramble mode, line 10 also includes a broad sync pulse having the required 5.0 microsecond duration as well as a third, prepositioned wide sync pulse corresponding to N1. The unique output provided by the pulse width discriminator of FIG. 9A will identify the beginning of a vertical field. As such, the clock for the microprocessor may be synchronized with the beginning of each vertical interval.

Having thus located the beginning of a field of the video signal, subroutine 953 will load the ENABLES 501 and 503 of FIG. 9B, such that the timing generated by FIG. 9A will be enabled.

In the event the microprocesesor is unsucessful in locating the beginning of the vertical field, the microprocessor will switch to a backup clock which is an internal register of the microprocessor which counts the horizontal drive pulses from the standard cell, generated by the circuitry of FIG. 9A.

Assuming that the vertical interval has been appropriately located, the next subroutine executed by the microprocessor is a read data bit subroutine 954. This subroutine will, at the beginning of lines 10-16, operate the data clock and serial data register, and serial to parallel latch of FIG. 9C, such that incoming data appearing at these lines are loaded into the registers, and read out in parallel format on the microbus of FIG. 9C.

Subroutine 956 will update all of the gate strobes of FIG. 9C, such that gate signals generated by FIG. 9A will be enabled for control of video processing.

Subroutine 957 performs the video inversion and an L10 invert sequence. Video inversion occurs when a scrambling algorithm has been decoded and the N1 number has been found in the previous cycle of the program execution such that the inversion pattern is known. The known inversion pattern provides, in the preferred embodiment, the identity of a beginning line at which alternate line inversion is to begin. This constitutes a video inversion strobe loaded in the register 501 for inverting each line so identified. The L10 invert command of subroutine 957 will merely provide an inversion of the output of the pulse width discriminator in the event a normal broadcast is detected.

Subroutine 958 will find the scrambling bin number N1 by sampling the L10 output of the pulse width discriminator of FIG. 9A. The presence of the third wide sync pulse will identify a line number, corresponding to a bin number containing the descrambling sequence.

Subroutine 959 will process the data which was read in in subroutine 954. The data is left hand justified by shifting the data in an internal register of the microprocessor such that it is field justified for further processing.

Subroutine 961 will decode the received data, checking for a check sum digit and also for any invalid data transitions which may have been received and noted by the illegal transition detector 604 of FIG. 9C. The integrity of the data having thus been verified permits the program execution to proceed to determining the descrambling sequence for the received video signal.

The determined bin number N1 is checked with a subsequently received bin number N1 in a subsequent field, in step 963 and if the locally stored reordering matrix indicates that the subsequently received N1 number does not correspond to what was expected, the microprocessor will look ahead for another bin of the reodering matrix bearing the most currently received N1 number. During the next field of the video signal, a subsequent N1 number is determined in subroutine 958 and if this corresponds with the next consecutive bin of the reordering matrix, the system is determined to have been locked on and descrambling will commence in accordance with each subsequent bin number for each subsequent field.

Subroutines 964, 965 and 966 provide local system operations at the decoder level.

The first of these subroutines is a text switch monitoring function. If the text switch, which is preferably located on the subscriber's set top converter, is enabled by a subscriber, the first of these subroutines will determine that detection and prepare for displaying any text information stored in the text RAM of FIG. 8A.

The second subroutine is a clock control which operates a real time clock that is used as a 96 hour timer. This clock is reset by a timer refresh number which is sent from the head-end periodically. When the timer refresh is received, the subroutine will initiate a reset of the clock. If the decoder is disabled for some reason, such as a power failure; or by the subscriber in an effort to evade downgrading of tiering, the timer refresh may be missed. In that case, the subroutine will disable the decoder when the clock counts to 96 hours.

Subroutine 3 is a status out subroutine which permits the system operator to verify that the subscriber's decoder is operating. As such, those ports shown on FIG. 9C as useful in a readout mode may be monitored while a status out subroutine is being executed.

Subroutine 4 includes a tamper pin detection which will sample the tamper pin input of the microprocessor periodically to determine whether or not the package containing the decoder has been opened or otherwise tampered with. Upon the detection of the tamper pin, a DISABLE command will be written into the microprocessor memory of FIG. 8B, disabling the decoder from further decoding any signals received.

The 5th subroutine determines whether a broadcast is to be descrambled or not.

The 6th subroutine, in the event audio scrambling is utilized, will enable an audio descrambler.

The 7th subroutine shown as part of subroutine 965 is a tier check to determine whether or not the decoder has been disabled for any tiers of broadcast service. The tier check will provide for a reading of the tier data which has been written into the memory of the subscriber, thus enabling him to receive or not receive certain broadcast tiers. This decode enable will be loaded in register 503 which will enable various DE enables of FIG. 9A.

The bin test 8 of the subroutine 966 will make sure that each received bin number is identical with a predetermined bin number, thus verifying that the lock on of subroutine 963 has been correctly effected.

The 96 hour timer of subroutine 966 will be read and if the lapsed time exceeds the predetermined criteria, for instance, 96 hours, the system will write a DISABLE command into the decoder RAM. This indicates that a reset to the timer has not been received in the time period allotted, indicating the subscriber has disconnected his decoder to avoid being disabled by a disabling command transmitted at the head end. Thus, it is not possible by examining the contents of the 96 hour timer to avoid being disabled by disconnecting the decoding apparatus by a subscriber.

Subroutine 968 will affect the character generation and display function for the system decoder. The characters are generated from any text data stored in the RAM and those characters presented for display by subroutine 969. Subroutine 969, if the text switch has been selected by the operator, will cause each of the alphanumeric characters generated in subroutine 968 to be displayed on the television receiver. The display alphanumeric characters are written in by appropriate closure of the TXTX switch of FIG. 12, thus generating the character.

Subroutine 970 is merely an idle stage for the main program structure, permitting return at the appropriate point in the program, corresponding to a new field of the video signal being received.

Also shown in FIG. 13 is a subroutine executed only in the event of a power-down command to the system. This could be in the form of a power failure. An interrupt generated in step 972 will dump the current tier, group number, status and 96 hour timer contents to the EEPROM for storage in subroutine 973. Thus, upon power up of the system, the decoder may be restored to the previous condition of operation.

The foregoing description of FIG. 13 is an overview of the total programming of the decoder microprocessor of FIG. 8A.

Thus, there has been described a complete scrambling and descrambling system for use in virtually all types of video transmission systems. Although the system has been described in terms of a cable television system, it is clear that other modes of transmission such as direct broadcast satellite, and other mediums may also employ the invention described more particularly by the claims which follow.

What is claimed is:

1. A method for scrambling a video signal, said video signal including a plurality of sequential fields, each field having a plurality of active line portions preceded by a horizontal synchronization period comprising:
   removing horizontal synchronization pulses from said synchronization period;
   compressing the amplitude of said active line portions;
   adding a psuedo synchronization pulse having an amplitude greater than said removed synchronization pulse to said synchronization period from which said horizontal synchronization pulses were removed, said pseudo synchronization pulse leading edge occurring at a time different than that of said removed synchronization pulse;
   changing the position of said pseudo synchronization pulses leading edge in subsequent fields; and;
   adding an offset voltage to said video signal during the active line period of said video signal.

2. The method of scrambling of claim 1 wherein said offset voltage is of a magnitude to place said active video line portions substantially below a black level, whereby said active video is normally not displayable on a normal television receiver.

3. The method of scrambling of claim 1 wherein said pseudo synchronization pulse has a magnitude of 140 IRE units.

4. A video signal scrambling system comprising:
   means for supplying a video signal for scrambling, said video signal comprising a plurality of fields of a plurality of signals each representing a horizontal line of information;
   said plurality of signals including a horizontal synchronization pulse identifying a beginning of a line, said field including a vertical synchronization portion for separating subsequent fields;
   means for removing said horizontal synchronization pulses in a plurality of said fields; and
   means for inserting in place of each removed horizontal synchronization pulse a bogus sync pulse having a leading edge which is earlier in time than said removed horizontal synchronization pulses for one of said fields, and inserting bogus sync pulses during a second field in place of each removed horizontal synchronization pulse having a leading edge which occurs subsequent to said bogus synchronization pulses of said one field and which occur prior to said removed synchronization pulses.

5. The video signal scrambling system of claim 4 further comprising means for compressing the amplitude of said video signal during that portion of the video signal which occurs between horizontal synchronization pulses.

6. The video signal scrambling system of claim 5 further comprising means for applying an offset voltage to said video signal during a portion of said video signal which occurs between vertical intervals and which occurs between horizontal synchronization pulses whereby the brightness level represented by said video signal is maintained below a predetermined brightness level.

7. The video signal scrambling system of claim 6 wherein said offset voltage is at a magnitude for offsetting said video signal portion to a position representing a substantially black picture level whereby an opaque picture is produced.

8. The video signal scrambling system of claim 4 wherein said bogus sync pulses have a magnitude greater than said removed sync pulses.

9. In a system for scrambling a video signal, an apparatus for transmitting a signal identifying one of a plurality of scrambled sequences comprising:
   means for generating during a vertical blanking interval of said video signal at least three unique horizontal synchronization pulses having a pulse width different from the pulse width of a plurality of remaining horizontal synchronization pulses, said unique pulses identifying specific lines of each field of said video signal; and
   means for inserting two of said generated synchronization pulses at the beginning of two lines of said video signal vertical interval, said two lines being the same for every transmitted field, and inserting a third of said unique pulses at a line the number of which identifies a scrambling sequence.

10. The scrambling system of claim 9 wherein said two unique synchronization pulses are inserted at the beginning of lines 1 and 10 of each vertical interval.

11. The scrambling system of claim 10 wherein said third unique pulse is located at the beginning of any of lines 11-17.

12. In a system for scrambling and descrambling a video signal, in accordance with one of a plurality of scrambling algorithms, means for transmitting to a receiving station the identity of a scrambling sequence comprising:
   means for inserting during the vertical interval of a field of said video signal a first group of horizontal synchronization pulses having a width greater than the remaining synchronization pulses at predetermined line numbers;
   means for inserting a second group of synchronization pulses of a pulse width less than the width of said synchronization pulses of a predetermined number of lines between said predetermined lines, said predetermined line numbers identifying one of said scrambling sequences; and
   means for transmitting said video signal to said receiving station.

13. In a system for scrambling and descrambling video signals, wherein a plurality of video lines are inverted in accordance with one of a series of scrambling sequences, a method for sending and receiving a decoding signal, comprising:

inserting during each field of said video signal at a plurality of predetermined line numbers horizontal synchronization pulses which are greater in width than the remaining synchronization pulses in said video signal; the position of said pulses identifying one of a series of said scrambling sequences;

inserting for a plurality of lines between said horizontal synchronization pulses a number of synchronization pulses of a different width;

transmitting to a receiving station said video signal;

detecting the width of each of said horizontal synchronization pulses received at said receiving station whereby said predetermined line numbers are identified;

storing in a predetermined order at said receiving station each of said scrambling sequences;

identifying one of said stored scrambling sequences by said predetermined line numbers; and inverting lines of said video signal in accordance with said identified scrambling sequence.

14. A system for scrambling a video signal with a different scrambling sequence for each field of said video signal comprising:

means for transmitting a scrambling algorithm signal during the vertical interval of said video signal, said scrambling algorithm identifying one plurality of scrambling sequences from another plurality of scrambling sequences;

means for inverting each of a plurality of video lines in accordance with one of a plurality of scrambling sequences;

means for transmitting during a vertical interval of said video signal a unique pulse having a position in said vertical field which identifies said one of a plurality of scrambling sequences;

means for receiving said transmitted video signal including:

means for decoding said scrambling algorithm and identifying said plurality of scrambling sequences;

means for detecting the position of said unique pulse from a received video signal whereby one of said plurality of scrambling sequences is identified; and means for reinverting said video signal in accordance with said identified scrambling sequence whereby a descrambled video signal is produced.

15. A system for scrambling a video signal which includes a plurality of fields of line information, each field separated by a vertical interval, comprising:

means for transmitting during said vertical interval data identifying a scrambling algorithm, said scrambling algorithm specifying a plurality of scrambling sequences for a plurality of fields of said video signal;

means for inserting a unique pulse of a specified duration at a location in said vertical interval which identifies one of said scrambling sequences;

means for decoding said scrambling algorithm data and generating the identity of each of said plurality of scrambling sequences from said algorithm;

means for detecting the position of said unique pulse in said vertical interval whereby one of said scrambling sequences are identified; and means for descrambling each of said video signal fields in accordance with an identified sequence, said sequence changing in subsequent fields in accordance with the position of said unique pulse in each newly received vertical interval.

16. The system of claim 15 wherein said scrambling sequences identify lines of said video signal which are inverted.

17. The system of claim 16 wherein each scrambling sequence comprises a plurality of alternate inverted lines of said video signal, the beginning line of each sequence changing for different fields of said video signal.

18. A system for descrambling a video signal including false synchronization pulses which are inserted in the video signal, an offset added to said video signal whereby active portions of said video signal are biased to below a black level, said video signal including during a specified line of said video signal, a reference black level and a white level, comprising:

means for sampling said video signal reference black level and white level whereby first and second video signal reference levels are produced;

buffer amplifier means for receiving said video signal and clamping said video signal at a level proportional to said black level whereby said video signal offset is removed;

means for detecting the pedestal edge of each horizontal blanking interval, and generating a sync pulse synchronized with said detected pedestal edge having a leading and falling edge of a normal descrambled video signal sync pulse; and means for inserting said synchronization pulse into said video signal in place of said false synchronization pulses whereby said video signal synchronization is restored.

19. The system of claim 18 further comprising means for inverting alternate lines of a video signal produced by said buffer amplifier.

20. The apparatus of claim 18 wherein said horizontal synchronization pulses have an amplitude level which is scaled from the level of said white signal and black level signal reference samples.

21. In a system for scrambling a video signal, wherein each subscriber of the system includes a decoder which can be disabled by transmitting a disable command, a method to prevent said subscriber from avoiding a disable command by disconnecting said decoder comprising:

sending a timing command as digital data in said video signal at a periodic interval to said subscriber decoder;

resetting a timer when each of said timing commands at said decoder have been received;

disabling said decoder from decoding a received scrambled signal when said timer indicates that a reset has not been received within a predetermined time interval.

22. The system of claim 21 further comprising:

sensing the mechanical integrity of a package containing said decoder; and disabling said decoder when said integrity has been broken.

* * * * *